US009026578B2

(12) United States Patent
Chory et al.

(10) Patent No.: US 9,026,578 B2
(45) Date of Patent: May 5, 2015

(54) SYSTEMS AND METHODS FOR PERSISTING DATA BETWEEN WEB PAGES

(75) Inventors: Susan Chory, Seattle, WA (US); David S. Ebbo, Redmond, WA (US); Robert M. Howard, Frisco, TX (US); Ting-Hao Yang, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1878 days.

(21) Appl. No.: 10/845,639

(22) Filed: May 14, 2004

(65) Prior Publication Data

US 2005/0256924 A1 Nov. 17, 2005

(51) Int. Cl.
G06F 15/16 (2006.01)
G06F 17/00 (2006.01)
G06F 17/30 (2006.01)

(52) U.S. Cl.
CPC .............................. *G06F 17/30607* (2013.01)

(58) Field of Classification Search
CPC ...... H04L 67/02; H04L 67/2842; H04L 67/32
USPC .......................................... 709/219; 715/236
See application file for complete search history.

(56) References Cited

U.S. PATENT DOCUMENTS

| 3,937,925 A | 2/1976 | Boothroyd |
| 3,956,615 A | 5/1976 | Anderson et al. |
| 4,186,871 A | 2/1980 | Anderson et al. |
| 4,624,880 A | 11/1986 | Goulding et al. |
| 4,707,872 A | 11/1987 | Hessel |
| 4,807,154 A | 2/1989 | Scully et al. |
| 4,923,057 A | 5/1990 | Carlson et al. |
| 4,948,442 A | 8/1990 | Manns |
| 5,019,439 A | 5/1991 | Momose |
| 5,044,030 A | 9/1991 | Balaton |
| 5,093,778 A | 3/1992 | Favor et al. |
| 5,128,200 A | 7/1992 | Colley et al. |
| 5,138,776 A | 8/1992 | Levin |

(Continued)

FOREIGN PATENT DOCUMENTS

| EP | 01111678 | 12/2000 |
| EP | 1156415 | 11/2001 |

(Continued)

OTHER PUBLICATIONS

Kudo et al.: "XML document security based on provisional authorization"; Proceedings of the 7th ACM conference on Computer and communications security; Year of Publication: 2000.*

(Continued)

*Primary Examiner* — Oscar Louie
*Assistant Examiner* — Lin Liu
(74) *Attorney, Agent, or Firm* — Ben Tabor; Kate Drakos; Micky Minhas

(57) ABSTRACT

The described systems and methods are directed at persisting data between web pages. A server receives object-related data associated with a first web page and a request for posting to a second web page from a client. The object-related data includes information about the objects in the first web page. Instances of the objects associated with the first web page are reconstructed based, at least in part, on the object-related data. The server generates rendering data of the second web page based, at least in part, on the reconstructed object instances. In this manner, the object-related data is allowed to persist from the first web page to the second web page.

29 Claims, 7 Drawing Sheets

(56) References Cited

U.S. PATENT DOCUMENTS

| | | |
|---|---|---|
| 5,193,185 A | 3/1993 | Lanter |
| 5,217,787 A | 6/1993 | Monahan |
| 5,254,387 A | 10/1993 | Gallucci |
| 5,256,223 A | 10/1993 | Alberts et al. |
| 5,325,481 A | 6/1994 | Hunt |
| 5,339,424 A | 8/1994 | Fushimi |
| 5,347,649 A | 9/1994 | Alderson |
| 5,358,276 A | 10/1994 | Lane |
| 5,375,242 A | 12/1994 | Kumar et al. |
| 5,395,674 A | 3/1995 | Schmidt et al. |
| 5,400,296 A | 3/1995 | Cushman et al. |
| 5,434,992 A | 7/1995 | Mattson |
| 5,444,926 A | 8/1995 | Allen et al. |
| 5,471,318 A | 11/1995 | Ahuja et al. |
| 5,513,317 A | 4/1996 | Borchardt et al. |
| 5,517,655 A | 5/1996 | Collins et al. |
| 5,572,643 A | 11/1996 | Judson |
| 5,573,824 A | 11/1996 | Klocek et al. |
| 5,577,253 A | 11/1996 | Blickstein |
| 5,604,908 A | 2/1997 | Mortson |
| 5,608,890 A | 3/1997 | Berger et al. |
| 5,613,117 A | 3/1997 | Davidson et al. |
| 5,623,661 A | 4/1997 | Hon |
| 5,649,131 A | 7/1997 | Ackerman et al. |
| 5,651,108 A | 7/1997 | Cain et al. |
| 5,659,653 A | 8/1997 | Murphy et al. |
| 5,659,753 A | 8/1997 | Murphy et al. |
| 5,664,228 A | 9/1997 | Mital |
| 5,667,895 A | 9/1997 | Jenker |
| 5,675,520 A | 10/1997 | Pitt, III et al. |
| 5,679,439 A | 10/1997 | Schmidt et al. |
| 5,689,703 A | 11/1997 | Atkinson et al. |
| 5,706,505 A | 1/1998 | Fraley et al. |
| 5,727,159 A | 3/1998 | Kikinis |
| 5,732,267 A | 3/1998 | Smith |
| 5,745,103 A | 4/1998 | Smith |
| 5,748,890 A | 5/1998 | Goldberg et al. |
| 5,753,061 A | 5/1998 | Rudy |
| 5,754,774 A | 5/1998 | Bittinger et al. |
| 5,764,235 A | 6/1998 | Hunt et al. |
| 5,764,873 A | 6/1998 | Magid et al. |
| 5,769,556 A | 6/1998 | Colley |
| 5,774,670 A | 6/1998 | Montulli |
| 5,793,982 A | 8/1998 | Shrader et al. |
| 5,801,702 A | 9/1998 | Dolan et al. |
| 5,802,334 A | 9/1998 | Nickolas et al. |
| 5,802,600 A | 9/1998 | Smith et al. |
| 5,806,078 A | 9/1998 | Hug et al. |
| 5,812,996 A | 9/1998 | Rubin et al. |
| 5,826,350 A | 10/1998 | Wallerstein |
| 5,835,712 A | 11/1998 | DuFresne |
| 5,835,724 A | 11/1998 | Smith |
| 5,835,770 A | 11/1998 | Shum et al. |
| 5,848,782 A | 12/1998 | Hein et al. |
| 5,855,020 A | 12/1998 | Kirsch |
| 5,870,559 A | 2/1999 | Leshem et al. |
| 5,873,097 A | 2/1999 | Harris et al. |
| 5,878,141 A | 3/1999 | Daly et al. |
| 5,878,282 A | 3/1999 | Mital |
| 5,889,992 A | 3/1999 | Koerber |
| 5,890,172 A | 3/1999 | Borman et al. |
| 5,892,937 A | 4/1999 | Caccavale |
| 5,897,622 A | 4/1999 | Blinn et al. |
| 5,897,644 A | 4/1999 | Nielsen |
| 5,911,068 A | 6/1999 | Zimmerman et al. |
| 5,911,145 A | 6/1999 | Arora et al. |
| 5,916,664 A | 6/1999 | Rudy |
| 5,923,882 A | 7/1999 | Ho et al. |
| 5,928,323 A | 7/1999 | Gosling et al. |
| 5,935,207 A | 8/1999 | Logue et al. |
| 5,935,210 A | 8/1999 | Stark |
| 5,937,163 A | 8/1999 | Lee et al. |
| 5,937,409 A | 8/1999 | Wetherbee |
| 5,937,419 A | 8/1999 | Oshiro et al. |
| 5,940,075 A | 8/1999 | Mutschler, III et al. |
| 5,940,847 A | 8/1999 | Fein et al. |
| 5,953,524 A | 9/1999 | Meng et al. |
| 5,956,489 A | 9/1999 | San Andres et al. |
| 5,961,601 A | 10/1999 | Iyengar |
| 5,963,952 A | 10/1999 | Smith |
| 5,965,249 A | 10/1999 | Sutton et al. |
| 5,974,430 A | 10/1999 | Mutschler, III et al. |
| 5,983,227 A | 11/1999 | Nazem et al. |
| 5,986,673 A | 11/1999 | Martz |
| 5,987,242 A | 11/1999 | Bentley et al. |
| 5,987,247 A | 11/1999 | Lau |
| 5,991,802 A | 11/1999 | Allard et al. |
| 5,995,753 A | 11/1999 | Walker |
| 6,006,230 A | 12/1999 | Ludwig et al. |
| 6,014,637 A | 1/2000 | Fell et al. |
| 6,014,666 A | 1/2000 | Helland et al. |
| 6,023,714 A | 2/2000 | Hill et al. |
| 6,032,207 A | 2/2000 | Wilson |
| 6,035,330 A | 3/2000 | Astiz et al. |
| 6,038,551 A | 3/2000 | Barlow et al. |
| 6,048,426 A | 4/2000 | Pratt |
| 6,058,455 A | 5/2000 | Islam et al. |
| 6,059,913 A | 5/2000 | Asmussen et al. |
| 6,061,518 A | 5/2000 | Hoffman |
| 6,061,690 A | 5/2000 | Nori et al. |
| 6,067,413 A | 5/2000 | Gustafsson et al. |
| 6,067,578 A | 5/2000 | Zimmerman et al. |
| 6,076,108 A | 6/2000 | Courts et al. |
| 6,081,837 A | 6/2000 | Stedman et al. |
| 6,101,502 A | 8/2000 | Heubner et al. |
| 6,101,607 A | 8/2000 | Bachand et al. |
| 6,108,717 A | 8/2000 | Kimura et al. |
| 6,115,744 A | 9/2000 | Robins |
| 6,119,078 A | 9/2000 | Kobayakawa et al. |
| 6,119,115 A | 9/2000 | Barr |
| 6,119,155 A | 9/2000 | Rossmann et al. |
| 6,121,968 A | 9/2000 | Arcuri et al. |
| 6,121,970 A | 9/2000 | Guedalia |
| 6,122,637 A | 9/2000 | Yohe et al. |
| 6,128,623 A | 10/2000 | Mattis et al. |
| 6,138,118 A | 10/2000 | Koppstein et al. |
| 6,138,150 A | 10/2000 | Nichols et al. |
| 6,138,171 A | 10/2000 | Walker |
| 6,151,624 A | 11/2000 | Teare et al. |
| 6,155,617 A | 12/2000 | Kuenzel |
| 6,167,438 A | 12/2000 | Yates et al. |
| 6,167,441 A | 12/2000 | Himmel |
| 6,167,524 A | 12/2000 | Goodnow et al. |
| 6,173,316 B1 | 1/2001 | De Boor et al. |
| 6,178,461 B1 | 1/2001 | Chan et al. |
| 6,182,121 B1 | 1/2001 | Wlaschin |
| 6,185,608 B1 | 2/2001 | Hon et al. |
| 6,185,625 B1 | 2/2001 | Tso et al. |
| 6,199,098 B1 | 3/2001 | Jones et al. |
| 6,202,199 B1 | 3/2001 | Wydogny et al. |
| 6,203,220 B1 | 3/2001 | Takenoshita et al. |
| 6,205,480 B1 | 3/2001 | Broadhurst et al. |
| 6,212,192 B1 | 4/2001 | Mirashrafi et al. |
| 6,218,958 B1 | 4/2001 | Eichstaedt et al. |
| 6,219,803 B1 | 4/2001 | Casella et al. |
| 6,223,217 B1 | 4/2001 | Pittus |
| 6,230,160 B1 | 5/2001 | Chan et al. |
| 6,230,313 B1 | 5/2001 | Callahan et al. |
| 6,237,006 B1 | 5/2001 | Weinberg et al. |
| 6,246,403 B1 | 6/2001 | Tomm |
| 6,246,422 B1 | 6/2001 | Emberling et al. |
| 6,247,044 B1 | 6/2001 | Gosling et al. |
| 6,249,844 B1 | 6/2001 | Schloss et al. |
| 6,253,228 B1 | 6/2001 | Ferris et al. |
| 6,253,234 B1 | 6/2001 | Hunt et al. |
| 6,275,934 B1* | 8/2001 | Novicov et al. ............... 713/168 |
| 6,279,151 B1 | 8/2001 | Breslau et al. |
| 6,282,670 B1 | 8/2001 | Rezaul Islam et al. |
| 6,286,133 B1 | 9/2001 | Hopkins |
| 6,292,188 B1 | 9/2001 | Carlson et al. |
| 6,297,819 B1 | 10/2001 | Furst |
| 6,300,947 B1 | 10/2001 | Kanevsky |
| 6,305,012 B1 | 10/2001 | Beadle et al. |
| 6,311,215 B1 | 10/2001 | Bakshi et al. |

(56) References Cited

U.S. PATENT DOCUMENTS

| | | |
|---|---|---|
| 6,314,424 B1 | 11/2001 | Kaczmarski et al. |
| 6,326,957 B1 | 12/2001 | Nathan et al. |
| 6,327,628 B1 | 12/2001 | Anuff et al. |
| 6,334,126 B1 | 12/2001 | Nagatomo et al. |
| 6,334,157 B1 | 12/2001 | Oppermann et al. |
| 6,336,161 B1 | 1/2002 | Watts |
| 6,341,291 B1 | 1/2002 | Bentley et al. |
| 6,341,316 B1 | 1/2002 | Kloba et al. |
| 6,343,148 B2 | 1/2002 | Nagy |
| 6,343,299 B1 | 1/2002 | Huang et al. |
| 6,345,279 B1 | 2/2002 | Li et al. |
| 6,351,767 B1 | 2/2002 | Batchelder et al. |
| 6,353,447 B1 | 3/2002 | Truluck et al. |
| 6,353,452 B1 | 3/2002 | Hamada et al. |
| 6,354,477 B1 | 3/2002 | Trummer |
| 6,356,283 B1 | 3/2002 | Guedalia |
| 6,359,633 B1 | 3/2002 | Balasubramaniam et al. |
| 6,363,352 B1 | 3/2002 | Dailey et al. |
| 6,370,561 B1 | 4/2002 | Allard et al. |
| 6,370,682 B1 | 4/2002 | Eckardt et al. |
| 6,373,841 B1 | 4/2002 | Goh et al. |
| 6,381,735 B1 | 4/2002 | Hunt |
| 6,384,846 B1 | 5/2002 | Hiroi |
| 6,389,590 B1 | 5/2002 | Miller et al. |
| 6,397,253 B1 | 5/2002 | Quinlan et al. |
| 6,401,099 B1 | 6/2002 | Koppolu et al. |
| 6,401,132 B1 | 6/2002 | Bellwood et al. |
| 6,405,241 B2 | 6/2002 | Gosling et al. |
| 6,411,999 B1 | 6/2002 | Tinkler |
| 6,412,008 B1 | 6/2002 | Fields et al. |
| 6,421,717 B1 | 7/2002 | Kloba et al. |
| 6,421,733 B1 | 7/2002 | Tso et al. |
| 6,424,981 B1 | 7/2002 | Isaac et al. |
| 6,426,761 B1 | 7/2002 | Kanevsky et al. |
| 6,430,575 B1 | 8/2002 | Dourish et al. |
| 6,438,576 B1 | 8/2002 | Huang et al. |
| 6,447,871 B1 | 9/2002 | Hawkins |
| 6,457,030 B1 | 9/2002 | Adams et al. |
| 6,457,172 B1 | 9/2002 | Carmichael et al. |
| 6,460,071 B1 | 10/2002 | Hoffman |
| 6,460,141 B1 | 10/2002 | Olden |
| 6,463,442 B1 | 10/2002 | Bent et al. |
| 6,466,203 B2 | 10/2002 | Van Ee |
| 6,470,381 B2 | 10/2002 | De Boor et al. |
| 6,473,609 B1 | 10/2002 | Schwartz et al. |
| 6,480,894 B1 | 11/2002 | Courts et al. |
| 6,487,590 B1 | 11/2002 | Foley et al. |
| 6,487,665 B1 | 11/2002 | Andrews et al. |
| 6,496,692 B1 | 12/2002 | Shanahan |
| 6,505,238 B1 | 1/2003 | Tran |
| 6,509,913 B2 | 1/2003 | Martin et al. |
| 6,514,408 B1 | 2/2003 | Simone |
| 6,515,682 B1 | 2/2003 | Washington et al. |
| 6,523,027 B1 | 2/2003 | Underwood |
| 6,530,075 B1 | 3/2003 | Beadle et al. |
| 6,535,896 B2 | 3/2003 | Britton et al. |
| 6,539,421 B1 | 3/2003 | Appelman et al. |
| 6,539,501 B1 | 3/2003 | Edwards |
| 6,542,908 B1 | 4/2003 | Ims |
| 6,542,967 B1 | 4/2003 | Major |
| 6,546,473 B2 | 4/2003 | Cherkasova et al. |
| 6,546,516 B1 | 4/2003 | Wright et al. |
| 6,556,217 B1 | 4/2003 | Makipae et al. |
| 6,557,038 B1 | 4/2003 | Becker et al. |
| 6,560,598 B2 | 5/2003 | Delo et al. |
| 6,560,618 B1 | 5/2003 | Ims |
| 6,560,639 B1 | 5/2003 | Dan et al. |
| 6,560,699 B1 | 5/2003 | Konkle |
| 6,560,774 B1 | 5/2003 | Gordon et al. |
| 6,563,517 B1 | 5/2003 | Bhagwat et al. |
| 6,563,913 B1 | 5/2003 | Kaghazian |
| 6,564,251 B2 | 5/2003 | Katariya et al. |
| 6,591,272 B1 | 7/2003 | Williams |
| 6,593,944 B1 | 7/2003 | Nicolas et al. |
| 6,598,059 B1 | 7/2003 | Vasudevan et al. |
| 6,601,233 B1 | 7/2003 | Underwood |
| 6,606,418 B2 | 8/2003 | Mitchell et al. |
| 6,606,671 B1 | 8/2003 | McNamer et al. |
| 6,609,128 B1 | 8/2003 | Underwood |
| 6,610,105 B1 | 8/2003 | Martin et al. |
| 6,622,168 B1 | 9/2003 | Datta |
| 6,622,216 B1 | 9/2003 | Lin |
| 6,622,268 B2 | 9/2003 | Holman |
| 6,643,712 B1 | 11/2003 | Shaw et al. |
| 6,651,108 B2 | 11/2003 | Popp et al. |
| 6,678,518 B2 | 1/2004 | Eerola |
| 6,686,938 B1 | 2/2004 | Jobs et al. |
| 6,687,735 B1 | 2/2004 | Logston et al. |
| 6,697,825 B1 | 2/2004 | Underwood et al. |
| 6,704,024 B2 | 3/2004 | Robotham et al. |
| 6,704,728 B1 | 3/2004 | Chang et al. |
| 6,714,794 B1 | 3/2004 | O'Carroll |
| 6,725,219 B2 | 4/2004 | Nelson et al. |
| 6,728,421 B2 | 4/2004 | Kokemohr |
| 6,732,364 B1 | 5/2004 | Bhaskaran et al. |
| 6,738,968 B1 | 5/2004 | Bosworth et al. |
| 6,757,708 B1 | 6/2004 | Craig et al. |
| 6,757,899 B2 | 6/2004 | Zhdankin et al. |
| 6,757,900 B1 | 6/2004 | Burd et al. |
| 6,772,261 B1 | 8/2004 | D'Antonio et al. |
| 6,772,408 B1 | 8/2004 | Velonis et al. |
| 6,782,403 B1 | 8/2004 | Kino et al. |
| 6,789,105 B2 | 9/2004 | Ludwig et al. |
| 6,792,575 B1 | 9/2004 | Samaniego et al. |
| 6,792,605 B1 | 9/2004 | Roberts et al. |
| 6,792,607 B1 | 9/2004 | Burd et al. |
| 6,799,190 B1 | 9/2004 | Boothby |
| 6,826,597 B1 | 11/2004 | Lonnroth et al. |
| 6,832,263 B2 | 12/2004 | Polizzi et al. |
| 6,834,297 B1 | 12/2004 | Peiffer et al. |
| 6,836,883 B1 | 12/2004 | Abrams et al. |
| 6,845,449 B1 * | 1/2005 | Carman et al. ............... 713/170 |
| 6,847,333 B2 | 1/2005 | Bokhour |
| 6,886,013 B1 | 4/2005 | Beranek |
| 6,892,226 B1 | 5/2005 | Tso et al. |
| 6,901,417 B2 | 5/2005 | Anglin et al. |
| 6,901,437 B1 | 5/2005 | Li |
| 6,904,600 B1 | 6/2005 | James et al. |
| 6,915,307 B1 | 7/2005 | Mattis et al. |
| 6,915,454 B1 | 7/2005 | Moore et al. |
| 6,918,107 B2 | 7/2005 | Lucas et al. |
| 6,920,480 B2 | 7/2005 | Mitchell et al. |
| 6,922,827 B2 | 7/2005 | Vasilik et al. |
| 6,928,488 B1 | 8/2005 | de Jong et al. |
| 6,931,633 B1 | 8/2005 | Vazquez et al. |
| 6,944,797 B1 | 9/2005 | Guthrie et al. |
| 6,948,174 B2 | 9/2005 | Chiang et al. |
| 6,950,875 B1 | 9/2005 | Slaughter et al. |
| 6,954,751 B2 | 10/2005 | Christfort et al. |
| 6,954,854 B1 | 10/2005 | Miura et al. |
| 6,957,383 B1 | 10/2005 | Smith |
| 6,961,750 B1 | 11/2005 | Burd et al. |
| 6,961,754 B2 | 11/2005 | Christopoulos et al. |
| 6,961,776 B1 | 11/2005 | Buckingham et al. |
| 6,964,009 B2 | 11/2005 | Samaniego et al. |
| 6,970,935 B1 | 11/2005 | Maes |
| 6,990,653 B1 | 1/2006 | Burd et al. |
| 7,013,340 B1 | 3/2006 | Burd et al. |
| 7,016,963 B1 | 3/2006 | Judd et al. |
| 7,028,312 B1 | 4/2006 | Merrick et al. |
| 7,076,786 B2 | 7/2006 | Burd et al. |
| 7,085,994 B2 | 8/2006 | Gvily |
| 7,099,870 B2 | 8/2006 | Hsu et al. |
| 7,099,939 B2 | 8/2006 | Von Klopp et al. |
| 7,117,504 B2 | 10/2006 | Smith et al. |
| 7,120,897 B2 | 10/2006 | Ebbo et al. |
| 7,151,966 B1 | 12/2006 | Baier et al. |
| 7,159,007 B2 | 1/2007 | Stawikowski |
| 7,162,723 B2 | 1/2007 | Guthrie et al. |
| 7,171,443 B2 | 1/2007 | Tiemann et al. |
| 7,171,454 B2 | 1/2007 | Nguyen |
| 7,181,731 B2 | 2/2007 | Pace et al. |
| 7,188,112 B1 | 3/2007 | Lindquist et al. |
| 7,188,155 B2 | 3/2007 | Flurry et al. |

(56) References Cited

U.S. PATENT DOCUMENTS

| | | |
|---|---|---|
| 7,206,805 B1 | 4/2007 | McLaughlin, Jr. |
| 7,216,294 B2 | 5/2007 | Gibbs et al. |
| 7,216,298 B1 | 5/2007 | Ballard et al. |
| 7,228,346 B1 | 6/2007 | Allavarpu et al. |
| 7,246,307 B2 | 7/2007 | Arora et al. |
| 7,249,196 B1 | 7/2007 | Peiffer et al. |
| 7,275,066 B2 | 9/2007 | Priestley |
| 7,281,202 B2 | 10/2007 | Croney et al. |
| 7,296,222 B1 | 11/2007 | Sakairi |
| 7,320,028 B2 | 1/2008 | Dinovo |
| 7,343,412 B1 | 3/2008 | Zimowski |
| 7,373,612 B2 | 5/2008 | Risch et al. |
| 7,380,239 B1 | 5/2008 | Srivastava et al. |
| 7,380,250 B2 | 5/2008 | Schechter et al. |
| 7,428,725 B2 | 9/2008 | Niyogi et al. |
| 7,451,352 B1 | 11/2008 | Moore et al. |
| 7,493,397 B1 | 2/2009 | Guthrie et al. |
| 7,509,404 B2 | 3/2009 | Agrawal et al. |
| 7,523,158 B1 | 4/2009 | Nickerson et al. |
| 7,523,173 B2 | 4/2009 | Seki et al. |
| 7,523,415 B1 | 4/2009 | Porter |
| 7,546,541 B2 | 6/2009 | Hori et al. |
| 7,594,001 B1 | 9/2009 | Ebbo et al. |
| 2001/0013070 A1 | 8/2001 | Sasaki |
| 2001/0018648 A1 | 8/2001 | Turner et al. |
| 2001/0027474 A1 | 10/2001 | Nachman et al. |
| 2001/0037404 A1 | 11/2001 | Hafsteinsson et al. |
| 2001/0047385 A1 | 11/2001 | Tuatini |
| 2001/0054020 A1 | 12/2001 | Barth et al. |
| 2002/0004815 A1 | 1/2002 | Muhlestein et al. |
| 2002/0008703 A1 | 1/2002 | Merrill et al. |
| 2002/0029214 A1 | 3/2002 | Yianilos et al. |
| 2002/0032701 A1 | 3/2002 | Gao et al. |
| 2002/0055878 A1 | 5/2002 | Burton et al. |
| 2002/0056085 A1 | 5/2002 | Fahraeus |
| 2002/0062396 A1 | 5/2002 | Kakei et al. |
| 2002/0073163 A1 | 6/2002 | Churchill et al. |
| 2002/0078101 A1 | 6/2002 | Chang et al. |
| 2002/0078144 A1 | 6/2002 | Lamkin et al. |
| 2002/0083171 A1 | 6/2002 | Hoogenboom et al. |
| 2002/0087949 A1 | 7/2002 | Golender et al. |
| 2002/0095445 A1 | 7/2002 | alSafadi et al. |
| 2002/0107891 A1 | 8/2002 | Leamon et al. |
| 2002/0108102 A1 | 8/2002 | Muhlestein et al. |
| 2002/0116534 A1 | 8/2002 | Teeple |
| 2002/0120677 A1 | 8/2002 | Goward et al. |
| 2002/0120753 A1 | 8/2002 | Levanon et al. |
| 2002/0129016 A1 | 9/2002 | Christfort et al. |
| 2002/0133635 A1 | 9/2002 | Schechter et al. |
| 2002/0133637 A1* | 9/2002 | Popp et al. ............ 709/315 |
| 2002/0138331 A1 | 9/2002 | Hosea et al. |
| 2002/0152244 A1 | 10/2002 | Dean et al. |
| 2002/0161923 A1 | 10/2002 | Dorsett et al. |
| 2002/0161928 A1 | 10/2002 | Ndili |
| 2002/0161938 A1 | 10/2002 | Bronomo et al. |
| 2002/0188890 A1 | 12/2002 | Shupps et al. |
| 2002/0194227 A1 | 12/2002 | Day et al. |
| 2002/0199172 A1 | 12/2002 | Bunnell |
| 2003/0001893 A1 | 1/2003 | Haley |
| 2003/0004998 A1 | 1/2003 | Datta |
| 2003/0005000 A1* | 1/2003 | Landsman et al. ........ 707/513 |
| 2003/0009476 A1 | 1/2003 | Fomenko et al. |
| 2003/0009519 A1 | 1/2003 | Gosling et al. |
| 2003/0009567 A1 | 1/2003 | Farouk |
| 2003/0018827 A1 | 1/2003 | Gutherie et al. |
| 2003/0025728 A1* | 2/2003 | Ebbo et al. ............ 345/744 |
| 2003/0028565 A1 | 2/2003 | Landsman et al. |
| 2003/0028892 A1 | 2/2003 | Gewickey et al. |
| 2003/0066056 A1 | 4/2003 | Petersen et al. |
| 2003/0074634 A1* | 4/2003 | Emmelmann ............ 715/513 |
| 2003/0097639 A1 | 5/2003 | Niyogi et al. |
| 2003/0110234 A1 | 6/2003 | Egli et al. |
| 2003/0128235 A1 | 7/2003 | Chernow et al. |
| 2003/0172054 A1 | 9/2003 | Berkowitz et al. |
| 2003/0182450 A1 | 9/2003 | Ong et al. |
| 2003/0187952 A1 | 10/2003 | Young et al. |
| 2003/0204622 A1 | 10/2003 | Blizniak et al. |
| 2003/0233477 A1 | 12/2003 | Ballinger et al. |
| 2004/0003112 A1 | 1/2004 | Alles et al. |
| 2004/0003117 A1 | 1/2004 | McCoy et al. |
| 2004/0003139 A1 | 1/2004 | Cottrille et al. |
| 2004/0003248 A1 | 1/2004 | Arkhipov |
| 2004/0012627 A1 | 1/2004 | Zakharia et al. |
| 2004/0015879 A1 | 1/2004 | Pauw et al. |
| 2004/0030740 A1 | 2/2004 | Stelting |
| 2004/0034831 A1* | 2/2004 | Grober et al. ............ 715/507 |
| 2004/0073873 A1 | 4/2004 | Croney et al. |
| 2004/0172484 A1 | 9/2004 | Hafsteinsson et al. |
| 2004/0187136 A1* | 9/2004 | Bhogal et al. ............ 719/311 |
| 2004/0189693 A1 | 9/2004 | Kenig |
| 2004/0205496 A1* | 10/2004 | Dutta et al. ............ 715/501.1 |
| 2004/0217985 A9 | 11/2004 | Ries et al. |
| 2004/0218045 A1 | 11/2004 | Bodnar et al. |
| 2004/0230958 A1 | 11/2004 | Alaluf |
| 2004/0255233 A1 | 12/2004 | Croney et al. |
| 2005/0027823 A1* | 2/2005 | Rana .................... 709/219 |
| 2005/0050164 A1 | 3/2005 | Burd et al. |
| 2005/0066287 A1 | 3/2005 | Tattrie et al. |
| 2005/0086384 A1 | 4/2005 | Ernst |
| 2005/0091675 A1 | 4/2005 | Ebbo et al. |
| 2005/0108633 A1 | 5/2005 | Sahota et al. |
| 2005/0108634 A1 | 5/2005 | Sahota et al. |
| 2005/0138560 A1 | 6/2005 | Lee et al. |
| 2005/0162439 A1 | 7/2005 | Bates et al. |
| 2005/0166230 A1 | 7/2005 | Gaydou et al. |
| 2005/0171967 A1 | 8/2005 | Yuknewicz |
| 2005/0193097 A1 | 9/2005 | Guthrie et al. |
| 2005/0198615 A1* | 9/2005 | Choi et al. ............ 717/108 |
| 2005/0203890 A1 | 9/2005 | Chen et al. |
| 2005/0204016 A1* | 9/2005 | McAuley ............ 709/218 |
| 2005/0229186 A1 | 10/2005 | Mitchell et al. |
| 2005/0251380 A1 | 11/2005 | Calvert et al. |
| 2005/0256834 A1 | 11/2005 | Millington et al. |
| 2005/0256924 A1 | 11/2005 | Chory et al. |
| 2005/0256933 A1 | 11/2005 | Millington et al. |
| 2005/0257138 A1 | 11/2005 | Chory et al. |
| 2005/0268292 A1 | 12/2005 | Ebbo et al. |
| 2005/0278351 A1 | 12/2005 | Niyogi et al. |
| 2006/0004910 A1 | 1/2006 | Burd et al. |
| 2006/0020883 A1 | 1/2006 | Kothari et al. |
| 2006/0095576 A1 | 5/2006 | Perry et al. |
| 2006/0106879 A1 | 5/2006 | Zondervan et al. |
| 2006/0112336 A1 | 5/2006 | Gewickey et al. |
| 2006/0130038 A1 | 6/2006 | Claussen et al. |
| 2007/0005795 A1 | 1/2007 | Gonzalez |
| 2007/0033533 A1 | 2/2007 | Sull |
| 2007/0174845 A1 | 7/2007 | Guthrie et al. |
| 2007/0214239 A1 | 9/2007 | Mechkov et al. |
| 2008/0028149 A1 | 1/2008 | Pardikar et al. |
| 2008/0155056 A1 | 6/2008 | Zimowski |
| 2008/0177859 A1 | 7/2008 | Nickerson |

FOREIGN PATENT DOCUMENTS

| | | |
|---|---|---|
| EP | 1156427 | 11/2001 |
| EP | 1156428 | 11/2001 |
| EP | 01156429 | 11/2001 |
| EP | 1164473 | 12/2001 |
| EP | 01241593 | 3/2002 |
| EP | 02005786 | 3/2002 |
| EP | 01111678 | 4/2002 |
| EP | 01111680.3-2201 | 4/2002 |
| EP | 01111681.1-2201 | 4/2002 |
| EP | 01111682 | 4/2002 |
| EP | 01271883 | 1/2003 |
| EP | 1452975 | 9/2004 |
| GB | 1367741 | 9/1974 |
| GB | 2339374 | 1/2000 |
| JP | 2001-129925 | 4/2001 |
| JP | 2002-24079 | 1/2002 |
| JP | 2002-41299 | 2/2002 |
| JP | 2002-49484 | 2/2002 |
| JP | 2002-49585 | 2/2002 |
| JP | 2002-49848 | 2/2002 |

(56) References Cited

FOREIGN PATENT DOCUMENTS

| | | |
|---|---|---|
| JP | 3957809 | 5/2007 |
| WO | WO 98/21651 | 5/1998 |
| WO | WO 98/44695 | 10/1998 |
| WO | WO 98/58478 | 12/1998 |
| WO | WO 99/34288 | 7/1999 |
| WO | WO 01/27783 | 4/2001 |
| WO | WO 01/75667 | 10/2001 |
| WO | WO 01/90933 | 11/2001 |
| WO | WO 02/21343 | 3/2002 |

OTHER PUBLICATIONS

Altinel et al.; "Efficient Filtering of XML Documents for Selective Dissemination of Information"; Proceedings of the 26th International Conference on Very Large Data Bases; Year of Publication: 2000.*
Bertino et al.; "Specifying and enforcing access control policies for XML document sources"; World Wide Web Journal; vol. 3, No. 3 / Nov. 2000.*
A.D. Gordon and D Syme, *Typing a Multi-Language Intermediate Code*, submitted to The 28th ACM Principles of Programming Languages, (Feb. 2001), pp. 1-9.
Abrams et al., "UIML an appliance-independent XML user interlace language," Computer Networks, Elsevier Science Publishes B.V., Amsterdam, NL, vol. 31, No. 11-16, May 17, 1909 pp. 1695-1708.
Abrams, Marc et al, "UIML: An XML Language for building Device-Independent User interfaces," XML Conference Proceedings. Proceedings of XML, Dec. 1999.
Aggarwal, Charu et al., "Caching on the World Wide Web" IEEE Transactions on Knowledge and Data Engineering, vol. 11, No. 1, Jan./Feb. 1999, pp. 94-107.
Aho, Alfred V. et al. "Compliers: Principles, Techniques, and Tools," Addison-Wesley Publishing Company, Mar. 1988, 32 pages.
Alves Dos Santooa, L.M., "Multimedia Data and tools for Web services over Wireless Platforms," IEEE Personal Communications, Oct. 1998, pp. 42-46.
Aoyagi, Tatsuya "Essays on Java API, Thirteenth Stage, Java Server Pages", Java WORLD, vol. 3, No. 12, IDF Japan, Inc., Dec. 1, 1999, pp. 98-106. (Japanese Patent Office CSDB Literature Number; Domestic Technical Magazine 200100651008).
Ballinger, "Fun with SOAP Extensions", Mar. 2001, MSDN, pp. 1-5.
Chapter 1 Introduction—"Java Script Language", Netscape Communications, Apr. 23, 2001.
Ciancarini et al., "An extensible rendering engine for XML and. HTNL", Computer Networks and ISDN System, North Holland Publishing, vol. 30, No. 1-7, Apr. 1998, pp. 225-237.
*ColdFusion Web Application Server*, update and summary, from Allaire Corp—www@allaire.com.
Davidson, et al., "Schema for Object-Oriented IML 2.0", Jul. 1999, W3 Consortium, pp. 1-29.
European Application No. 01111678.7, Communication dated Sep. 13, 2005, 4 pages.
European Application No. 01111678.7, Communication dated Sep. 27, 2004, 3 pages.
European Application No. 01111678.7, Communication dated Sep. 27, 2006, 3 pages.
Fabre, Christian et al., *Java-ANDF Feasibility Study Final Report*, Mar. 26, 1997.
Flammia, G "The Wireless Internet Today and Tomorrow" IEEE intelligent System [Online] vol. 15, Sep. 2000, pp. 82.83.
Franklin, Keith; "Supercharge Data Binding"; Visual Basic Programmer's Journal, Mar. 2000; 7 pages.
Gosling, J. et al., *The Java Language Environment*, A White Paper, Sun Microsystems Computer Company, Oct. 1, 1995 pp. 1, 4-85.
Heins, et al., "Taking Your Information Into the Wireless World: Developing Information for Delivery to Mobile Devices", IEEE, pp. 237-244, Oct. 2001.
Henglein, Fritz & Jorgensen, Jesper, *Formally Optimal Boxing*, Proceedings of the 21st ACM SIGPLAN-SIGACT Symposium on Principles of Programming Languages, 1994, pp. 213-216.
Howard, "Web Services with ASP.NET", Feb. 2001, MSDN, pp. 1-9.

Kaasinen Elja et al.; "Two approaches to bringing internet services to WAP devices," Computer Networks and ISDN Systems, North Holland Publishing, Amsterdam, NL, vol. 33, No. 1, 2000, pp. 231-246.
U.S. Appl. No. 09/875,324, Advisory Action dated Sep. 20, 2005, 3 pages.
U.S. Appl. No. 10/174,348, Advisory Action dated Aug. 28, 2006, 3 pages.
W3C, SOAP Version 1.2 Specification Jul. 9, 2001 Working Draft, Jul. 2001.
*Web Services Description Language* (WSDL), Mar. 2001, W3C.
Winer, Dave, "XMP RPC Specification", Jun. 15, 1999.
Leroy, X. "Unboxed Objects and Polymorphic", in 19th ACM SIGPLAN-SIGACT Symposium on Principles of Programming Languages, ACM Press, 1992, pp. 177-188.
Park, Y.G. and B. Goldberg, "Escape Analysis on Lists", in *ACM SIGPLAN on Programming Language Design and Implementation*, ACM Press, 1992, pp. 116-127.
Yamamoto, Atsushi, "Let's Fully Use Windows NT Server, Eighth Installment," OPEN DESIGN, vol. 5, No. 3, pp. 126-140 (Fig. 12 to 15 in particular), CQ Publishing Co., Ltd., Japan, Jun. 1, 1998.
Yamato, Yoshiyuki, "Real-World Situation of Development Viewed from Sample System: In-House Training System Using OLE DB Provider for OBDC," TRY! PC Extra, Use of SQL Server 7.0 by Growing Company, pp. 54-91, CQ Publishing Co., Ltd., Aug. 1, 1999.
Yoshikawa, Kazuhiro, et al. "Expanding a System via the Internet: Construction/Operation Points to be Considered: Exploring a Construction/Operation for Improving Reliability and Security", Nikkei Open Systems, No. 63, pp, 182-191, Nikkei Business Publications, Inc., Jun. 15, 1998 (CSBD: Technical Journal in Japan 199800933009).
European Application 01111678.7, Response dated Jan. 20, 2006, [18pp].
European Application 01111678.7, Response dated Jan. 24, 2005, [8pp].
European Application 01111678.7, Search Report mailed Apr. 5, 2002, 3 pages.
European Application 01111680.3, Communication mailed Oct. 16, 2006, 10 pages.
European Application 01111680.3, Communication mailed Dec. 12, 2005, 5 pages.
European Application 01111680.3, Decision to Refuse a European Patent Application mailed Dec. 23, 2009, 35 pages.
European Application 01111680.3, Search Report mailed Apr. 12, 2002, 3 pages.
European Application 01111680.3, Summons to Attend Oral Proceedings mailed Aug. 6, 2009, 63 pages.
European Application 01111681.1, Communication mailed Nov. 28, 2005, 5 pages.
European Application 01111681.1, Decision to Grant mailed Dec. 21, 2006, 2 pages.
European Application 01111681.1, Search Report mailed Apr. 12, 2002, 3 pages.
European Application 01111682.9, Communication mailed Jun. 15, 2004, 7 pages.
European Application 01111682.9, Communication mailed Aug. 21, 2009, 4 pages.
European Application 01111682.9, Search Report mailed Apr. 4, 2002, 3 pages.
European Application 01115100.8, Search Report mailed Apr. 29, 2004, 3 pages.
European Application 02005786.5, Communication mailed Jan. 15, 2010, 7 pages.
European Application 02005786.5, Partial Search Report mailed Oct. 12, 2005, 6 pages.
European Application 02005786.5, Search Report mailed Jun. 7, 2006, 6 pages.
European Application 02005786.5, Summons to Attend Oral Proceedings mailed Jun. 1, 2012, 10 pages.
European Application No. 01111678.7, Response to Communication dated Feb. 5, 2007, [12pp].
Japan Application 2001-129923, Decision to Grant a Patent mailed Aug. 31, 2007, 1 page.

(56) References Cited

OTHER PUBLICATIONS

Japan Application 2001-129923, Notice of Rejection mailed Mar. 16, 2007, 3 pages.
Japan Application 2001-129924 (Appeal 2008-017159), Appeal Decision mailed Oct. 29, 2010, 4 pages.
Japan Application 2001-129924, Appeal Brief mailed Sep. 22, 2008, 8 pages.
Japan Application 2001-129924, Final Decision of Rejection mailed Apr. 4, 2008, 19 pages.
Japan Application 2001-129924, Interrogation mailed May 18, 2010, 12 pages.
Japan Application 2001-129924, Notice of Rejection mailed May 18, 2007, 5 pages.
Japan Application 2001-129924, Notice of Rejection mailed Oct. 20, 2006, 22 pages.
Japan Application 2001-129924, Written Appeal mailed Jul. 3, 2008, 2 pages.
Japan Application 2001-129925 (Appeal 2007-001356), Appeal Decision (NOA), mailed Feb. 19, 2010, 4 pages.
Japan Application 2001-129925 (Appeal 2007-001356), Interrogation mailed Mar. 6, 2009, 7 pages.
Japan Application 2001-129925 (Appeal 2007-001356), Notice of Rejection mailed Oct. 16, 2009, 9 pages.
Japan Application 2001-129925, Notice of Final Decision of Rejection mailed Oct. 17, 2006, 7 pages.
Japan Application 2001-129925, Notice of Rejection mailed Mar. 3, 2006, 10 pages.
Japan Application 2001-129926 (Appeal 2008-003006), Appeal Decision mailed Feb. 18, 2011, 4 pages.
Japan Application 2001-129926 (Appeal 2008-003006), Interrogation mailed May 18, 2010, 7 pages.
Japan Application 2001-129926 (Appeal 2008-003006), Notice of Rejection mailed Dec. 17, 2010, 2 pages.
Japan Application 2001-129926, Appeal Brief mailed Mar. 10, 2008, 5 pages.
Japan Application 2001-129926, Notice of Final Decision of Rejection mailed Nov. 9, 2007, 8 pages.
Japan Application 2001-129926, Notice of Rejection mailed Jul. 17, 2007, 15 pages.
Japan Application 2002-192640, Notice of Allowance mailed Mar. 24, 2009, 6 pages.
Japan Application 2002-192640, Notice of Rejection mailed Aug. 19, 2008, 7 pages.
Japan Application 2002-192640, Official Notice mailed Sep. 21, 2007, 8 pages.
Japan Application 2008-199892, Notice of Allowance mailed May 25, 2012, 6 pages.
Japan Application 2008-199892, Notice of Rejection mailed Feb. 3, 2012, 3 pages.
Japan Application 2008-199892, Notice of Rejection mailed Aug. 19, 2011, 10 pages.
U.S. Appl. No. 09/989,562, Office Action dated Jan. 30, 2007, (13 pages).
U.S. Appl. No. 09/570,071, Advisory Action mailed Aug. 13, 2004, (4 pages).
U.S. Appl. No. 09/570,071, Amendment and Response filed Jan. 23, 2002, (14 pages).
U.S. Appl. No. 09/570,071, Amendment and Response filed Aug. 27, 2003, (28 pages).
U.S. Appl. No. 09/570,071, Amendment and Response filed Dec. 31, 2003, (23 pages).
U.S. Appl. No. 09/570,071, Amendment and Response mailed Jun. 17, 2004, (23 pages).
U.S. Appl. No. 09/570,071, Appeal Brief filed Jan. 18, 2005, (35 pages).
U.S. Appl. No. 09/570,071, Final Office Action mailed Mar. 17, 2004, (23 pages).
U.S. Appl. No. 09/570,071, Non-Final Office Action mailed Jul. 17, 2002, (15 pages).
U.S. Appl. No. 09/570,071, Non-Final Office Action mailed Oct. 27, 2003, (22 pages).
U.S. Appl. No. 09/570,071, Patent Board Decision mailed Mar. 9, 2009, (17 pages).
U.S. Appl. No. 09/570,071, Supplemental Final Rejection mailed May 28, 2003, (19 pages).
U.S. Appl. No. 09/570,071, Examiner's Answer to Appeal Brief mailed Jul. 11, 2007, (24 pages).
U.S. Appl. No. 09/570,071, Final Office Action mailed Apr. 4, 2003, (19 pages).
U.S. Appl. No. 09/574,165, Amendment and Response dated Jan. 20, 2005, (13 pages).
U.S. Appl. No. 09/574,165, Amendment and Response dated Feb. 12, 2004, (24 pages).
U.S. Appl. No. 09/574,165, Amendment and Response dated Jun. 3, 2004, (24 pages).
U.S. Appl. No. 09/574,165, Amendment and Response dated Sep. 4, 2003, (20 pages).
U.S. Appl. No. 09/574,165, Final Office Action dated Oct. 22, 2004, (5 pages).
U.S. Appl. No. 09/574,165, Non-Final Office Action dated Mar. 30, 2004, (14 pages).
U.S. Appl. No. 09/574,165, Non-Final Office Action dated Jun. 6, 2003, (9 pages).
U.S. Appl. No. 09/574,165, Office Action dated Dec. 4, 2003, (14 pages).
U.S. Appl. No. 09/875,324, Amendment and Response dated Aug. 19, 2005, (13 pages).
U.S. Appl. No. 09/875,324, Amendment and Response dated Feb. 16, 2007, (17 pages).
U.S. Appl. No. 09/875,324, Amendment and Response dated Apr. 5, 2005, (12 pages).
U.S. Appl. No. 09/875,324, Amendment and Response dated Apr. 10, 2006, (12 pages).
U.S. Appl. No. 09/875,324, Amendment and Response dated Sep. 12, 2006, (17 pages).
U.S. Appl. No. 09/875,324, Final Office Action dated Jun. 30, 2005, (16 pages).
U.S. Appl. No. 09/875,324, Final Office Action dated Jul. 12, 2006, (16 pages).
U.S. Appl. No. 09/875,324, Non-Final Office Action dated Jan. 5, 2005, (18 pages).
U.S. Appl. No. 09/875,324, Non-Final Office Action dated Jan. 10, 2006, (12 pages).
U.S. Appl. No. 09/875,324, Non-Final Office Action dated Nov. 17, 2006, (13 pages).
U.S. Appl. No. 09/875,324, Notice of Allowance dated May 11, 2007, (17 pages).
U.S. Appl. No. 09/875,324, Notice of Allowance dated Sep. 11, 2008, (5 pages).
U.S. Appl. No. 09/875,324, Notice of Allowance dated Sep. 19, 2008, (3 pages).
U.S. Appl. No. 09/875,324, Notice of Allowance dated Mar. 14, 2008, (22 pages).
U.S. Appl. No. 09/879,790, Amendment and Response mailed Sep. 8, 2004, (11 pages).
U.S. Appl. No. 09/879,790, Non-Final Office Action mailed Apr. 8, 2004, (9 pages).
U.S. Appl. No. 09/879,790, Notice of Allowance mailed Apr. 29, 2005, (4 pages).
U.S. Appl. No. 09/879,790, Notice of Allowance mailed Nov. 18, 2004, (4 pages).
U.S. Appl. No. 09/894,828, Advisory Action mailed Apr. 22, 2005, (3 pages).
U.S. Appl. No. 09/894,828, Amendment and Response filed Feb. 17, 2006, (25 pages).
U.S. Appl. No. 09/894,828, Amendment and Response filed Mar. 14, 2005, (16 pages).
U.S. Appl. No. 09/894,828, Amendment and Response filed Oct. 4, 2004, (13 pages).
U.S. Appl. No. 09/894,828, Amendment and Response filed Oct. 10, 2001, (11 pages).

(56) References Cited

OTHER PUBLICATIONS

U.S. Appl. No. 09/894,828, Appeal Brief filed Aug. 17, 2005, (24 pages).
U.S. Appl. No. 09/894,828, Final Office Action mailed Jan. 12, 2005, (9 pages).
U.S. Appl. No. 09/894,828, Non-Final Office Action mailed Jun. 3, 2004, (7 pages).
U.S. Appl. No. 09/894,828, Non-Final Office Action mailed Nov. 17, 2005, (9 pages).
U.S. Appl. No. 09/894,828, Notice of Allowance mailed May 23, 2006, (8 pages).
U.S. Appl. No. 09/894,828, Notice of Allowance mailed Jul. 25, 2006, (2 pages).
U.S. Appl. No. 09/934,122, Advisory Action mailed Mar. 27, 2006, (3 pages).
U.S. Appl. No. 09/934,122, Final Office Action dated Dec. 19, 2005, (9 pages).
U.S. Appl. No. 09/934,122, Non-Final Rejection mailed Jun. 21, 2005, (8 pages).
U.S. Appl. No. 09/934,122, Non-Final Rejection mailed Aug. 9, 2006, (11 pages).
U.S. Appl. No. 09/934,122, Non-Final Rejection mailed Dec. 21, 2004, (9 pages).
U.S. Appl. No. 09/989,562, Final Office Action dated Jan. 30, 2007, (13 pages).
U.S. Appl. No. 09/989,562, Final Office Action dated Jul. 27, 2005, (9 pages).
U.S. Appl. No. 09/989,562, Office Action dated Jan. 13, 2005, (7 pages).
U.S. Appl. No. 09/989,562, Office Action dated Jul. 6, 2007, (8 pages).
U.S. Appl. No. 09/989,562, Office Action dated Jul. 19, 2006, (11 pages).
U.S. Appl. No. 09/999,565, Final Rejection mailed May 25, 2005, (14 pages).
U.S. Appl. No. 09/999,565, Final Rejection mailed Jul. 25, 2006, (13 pages).
U.S. Appl. No. 09/999,565, Advisory Action mailed Aug. 12, 2005, (4 pages).
U.S. Appl. No. 09/999,565, Non-Final Rejection mailed Feb. 8, 2006, (11 pages).
U.S. Appl. No. 09/999,565, Office Action dated Nov. 17, 2004, (11 pages).
U.S. Appl. No. 10/174,348, Amendment and Response dated Aug. 17, 2006, (15 pages).
U.S. Appl. No. 10/174,348, Amendment and Response dated Mar. 1, 2006, (13 pages).
U.S. Appl. No. 10/174,348, Final Office Action dated Jun. 19, 2006, (19 pages).
U.S. Appl. No. 10/174,348, Office Action dated Dec. 1, 2005, (23 pages).
U.S. Appl. No. 10/174,348, Office Action dated Dec. 21, 2006, (11 pages).
U.S. Appl. No. 10/269,072, Advisory Action Mar. 6, 2006, (3 pages).
U.S. Appl. No. 10/269,072, Advisory Action mailed Feb. 8, 2007, (3 pages).
U.S. Appl. No. 10/269,072, Final Rejection mailed Dec. 4, 2007, (53 pages).
U.S. Appl. No. 10/269,072, Office Action dated Apr. 19, 2007, (46 pages).
U.S. Appl. No. 10/269,072, Office Action dated Apr. 28, 2005, (25 pages).
U.S. Appl. No. 10/269,072, Office Action dated Jun. 14, 2006, (15 pages).
U.S. Appl. No. 10/269,072, Office Action dated Nov. 30, 2006, (31 pages).
U.S. Appl. No. 10/269,072, Office Action dated Dec. 9, 2005, (25 pages).
U.S. Appl. No. 10/840,965, Office Action dated Jun. 20, 2008, (21 pages).
U.S. Appl. No. 10/840,965, Office Action dated Nov. 28, 2007, (22 pages).
U.S. Appl. No. 11/035,754, Amendment and Response filed Jun. 27, 2008, (15 pages).
U.S. Appl. No. 11/035,754, Amendment and Response filed Oct. 12, 2007, (11 pages).
U.S. Appl. No. 11/035,754, Final Office Action mailed Dec. 28, 2007, (15 pages).
U.S. Appl. No. 11/035,754, Non-Final Office Action mailed Jul. 12, 2007, (12 pages).
U.S. Appl. No. 11/035,754, Notice of Allowance mailed Jul. 25, 2008, (14 pages).
U.S. Appl. No. 11/120,511, Amendment and Response dated Feb. 6, 2009, (16 pages).
U.S. Appl. No. 11/120,511, Amendment and Response dated Jul. 2, 2008, (17 pages).
U.S. Appl. No. 11/120,511, Non-Final Office Action dated Oct. 6, 2008, (8 pages).
U.S. Appl. No. 11/120,511, Notice of Allowance dated Mar. 23, 2009, (4 pages).
U.S. Appl. No. 11/120,511, Office Action dated Jan. 2, 2008, (8 pages).
U.S. Appl. No. 11/158,816, Amendment and Response filed Apr. 16, 2008, (9 pages).
U.S. Appl. No. 11/158,816, Amendment and Response filed Oct. 22, 2007, (11 pages).
U.S. Appl. No. 11/158,816, Non-Final Office Action mailed Feb. 14, 2008, (9 pages).
U.S. Appl. No. 11/158,816, Non-Final Office Action mailed Jun. 20, 2007, (4 pages).
U.S. Appl. No. 11/158,816, Notice of Allowance mailed Apr. 5, 2007, (6 pages).
U.S. Appl. No. 11/165,416, Amendment and Response dated Dec. 18, 2006, (14 pages).
U.S. Appl. No. 11/165,416, Notice of Allowance dated Apr. 3, 2008, (23 pages).
U.S. Appl. No. 11/165,416, Notice of Allowance dated Aug. 16, 2007, (6 pages).
U.S. Appl. No. 11/165,416, Office Action dated Sep. 18, 2006, (6 pages).
U.S. Appl. No. 11/621,435, Amendment and Response filed Mar. 23, 2009, (11 pages).
U.S. Appl. No. 11/621,435, Non-Final Office Action mailed Dec. 22, 2008, (6 pages).
U.S. Appl. No. 11/621,435, Notice of Allowance mailed Jun. 3, 2009, (7 pages).
Altinel et al.: "Efficient Filtering of XML Documents for Selective Dissemination of Information"; Proceeding of the 26th International Conference on Very Large Data Bases; Year of Publication: 2000.
Bertino et al.: "Specifying and enforcing access control policies for XML document sources"; World Wide Web Journal; vol. 3, No. 3/Nov. 2000.
Burnett, M. et al., "Visual Object-Oriented Programming," pp. 1-42, 199-274, published 1994.
Drape, et al. "Transforming the .Net intermediate language using path logic programming," Dec. 2002, pp. 133-144. Online retrieved at <http://delivery.acm.org/10.1145/580000/571171/p133-drape.pdf>.
European Application 01111679.5, Search Report mailed Apr. 4, 2002, 3 pages.
International University of Japan-ARIS-F Software R&D Center, "Distributed Application Development Using Java", Toppan Co., Ltd, Dec. 20, 1999, First Edition, pp. 277-289 (Japanese Patent Office CSDB Literature Number: Book 200203759001, ISBN: 4-8101-9016-1).
Jiwu Tao et al. "Concurrency control and data replication strategies for large-scale and wide distributed databases", international conference on database systems for advanced applications, 2001 proceedings, Apr. 2001, pp. 352-359.
Johnson, Andrew et al., *The ANDF Technology Program at the OSF RI*; Dec. 8, 1992.
Kaffe, "Server Side Java", Jan. 16, 1998.

(56) References Cited

OTHER PUBLICATIONS

Kagal, et al., "Centaurus: A Framework for Intelligent Services in a Mobile Environment", Computer Science and Electrical Engineering, IEEE, pp. 195-201, Apr. 2001.
Kazuhide, Hirose. "This is the Server Side Technology!! The 3rd installment: JSP operates in the same mechanism as Servlet," NIKKEI SOFTWARE, vol. 2, No. 10 (Consecutive No. 16), p. 197, Nikkei Business Publications, Inc., Japan, Aug. 24, 1999.
Kirda, "Web Engineering Device Independent Web Services", Distributed Systems Group, IEEE, pp. 795-796, May 2001.
Krikelis, A., "Mobile multimedia: shapring the Inforverse", IEEE Concurrency, Jan.-Mar. 1999, pp. 7-9.
Kuslich, JJ. "Introduction to JavaServer Pages: Server-Side Scripting the Java Way," DevEdge Online Archive, [online] 1999, pp. 51-108, retrieved from the internet: URL:http://developer.netscape.com/doc.manuals/ssjs/1_4/ssjs.pdf> [retrieved on Jul. 11, 2014].
Leinecker "Special Edition Using Microsoft ASP.NET", Mar. 2000. Online retrieved at <http://proquest.safaribooksonline.com>.
Lindholm, Tim & Yellin, Frank, *The Java Virtual Machine Specification, Second Edition*, Sun Microsystems, 1999, Ch. 2, pp. 1-44.
M. Tofte and J.P. Talpin, Region-Based Memory Management, *Information and Computation*, 1997, vol. 132(2), pp. 109-176.
Manual page of AR, Free Software Foundation, 1999. Retrieved from Internet on Feb. 20, 2008. Retrieved from URL: <http://www.freebsd.org/cgi/man.cgi?query=ar&apropos=0&sektion=0&manpath=FreeBSD+4.8-RELEASE&format=html>.
Manual Page of GCC, Free Software Foundation, 1988. Retrieved from Internet on Jan. 20, 2008. Retrieved from URL: <http://www.freebsd.org/cgi/man.cgi?query=gcc&apropos=0&sektion=0&manpath=FreeBSD+4.8-RELEASE&format+html>.
Marshall, James; "HTTP Made Really Easy: A Practical Guide to Writing Clients and Servers"; Aug. 15, 1997; 14 pages.
McPherson, Scott. "Java Server Pages: A Developer's Perspective", [online], Apr. 2000, Sun Microsystems, [searched on Mar. 26, 2008], Internet <URL:http://java.sun.com/developer/technicalArticles/Programming/jsp/index.html>.
*Metadata Activity Statement*, Feb. 2001, W3C.
Metadata Activity Statement, http://web.archive.org/web/20000616163950/http://www.w3.org/Metadata/Activity.html, May 8, 2000, pp. 1-5.
Moore, M, et al. "Migrating legacy user interfaces to the internet: shifting dialogue initiative", IEEE, Nov. 23, 2000, pp. 52-58.
Muller-Wilken S. et al.; "On integrating mobile devices into a workflow management scenario," Database and Expert Systesm Applications, 2000. Proceedings 11th International Workshop on Sep. 4-8, 2000, Piscataway, NJ, USA, IEEE, pp. 186-190.
Peeling, Dr. N. E., *ANDF Features and Benefits*, Feb. 5, 1993. [9 pp.].
Platt, "Thunderclap, the Newsletter of Rolling Thunder Computing", dated to Aug. 2001, vol. 3, No. 2, pp. 1-18.
Rational, Rose/C++, Rational Software Corporation, whole manual, released 1996. [210 pp.].
Ren, Robin, "Practical Active Server Pages Technique: Porting Windows CGI Applications to ASP", Microsoft Interactive Developer, No. 10, pp. 89-98, ASCII Corporation, Nov. 18, 1998 (CSDB: Technical Journal in Japan 2000001200009).
S. Peyton Jones and J. Launchbury, Unboxed Values as First Class Citizens, *In Functional Programming Languages and Computer Architecture*, vol. 523 of Lecture Notes in Computer Science, Springer Verlag, 1991, pp. 636-666.
Sanden, Bo. "Software Construction with Examples in ADA", published 1994, pp. 104-109.
Scott, David and Richard Sharp, "Developing Secure Web Applications," IEEE Internet Computing, vol. 6 No. 6, pp. 38-45, Nov.-Dec. 2002.
Seshadri, Govind. "Understanding JavaServer Pages Model 2 Architecture," JavaWorld Solutions for Java Developers, Dec. 29, 1999.
Shao, Zhong, *Flexible Representation Analysis*, Proceedings of the Second ACM SIGPLAN International Conference on Functional Programming, 1997, pp. 85-98.
Shepherd, George. "ASP.NET Connection Model and Writing Custom HTTP Handler/Response Objects," The ASP Column, MSDN Magazine [online], U.S., Microsoft Corp., Jul. 2001, [Mar. 12, 2009 Search], URL, http://msdn.microsoft.com/ja-jp/magazine/cc301320 (en-us, printer).aspx.
Shepherd, George. "The ASP Column", HTTP Modules, MSDN Magazine [online], U.S., Microsoft Corp., May 2002, [Mar. 12, 2009 Search], URL, http://msdn.microsoft.com/ja-jp/magazine/c301362 (en-us, printer).aspx.
Shinpo, Masahiro. "Practice for Those Who Can Use Notes! Introduction to Web Applications, Sixth Installment," Notes/Domino Magazine, vol. 4, No. 11, pp. 100-104 (the column on p. 104 in particular), Softbank Publishing Inc., Japan, Dec. 1, 1999.
Spencer, Ken. "Beyond the Browser, The 1st Installment: Page Object of ASP," Microsoft Interactive DEVELOPER, No. 11, pp. 116-118, ASCII Corporation, Japan, Jan. 18, 1999.
*Spyglass Prism 3.1 Supports the latest Standards for Transmission of Content to Wireless Devices*, Internet citation, Jul. 5, 1000.
Standard Output of Comman, 'ar': contents of '/usr/lib/libbz2.a', print out of files in '/usr/lib/libbz2.a'.
Stone, R.G. and J. Dhiensa. "Proving the Validity and Accessibility of Dynamic Web-pages," AMC International Conference Procceding Series vol. 63, pp. 45-49, 2004.
Sully, Chris. "ASP Configurations Files," Feb. 2003. Online retrieved at <www.dotnetjohn.com/PrintFriend.aspx?articleid=24>.
Thiemann, Peter, *Unboxed Values and Polymorphic Typing Revisiting*, Proceedings of the Seventh International Conference On Functional Programming Languages and Computer Architecture, 1995, pp. 24-35.
Trupin, Joshua. "Feature Series 1, A Thorough Study of the Next Generation Development Environment "Visual Basic 7.0": The Functions of Visual Basic, Web Forms, Web Services, and Expanded Language for the Next Generation," msdn magazine, No. 2, pp. 29-31, ASCII Corporation, Japan, May 18, 2000.
Tuecke, "Microsoft Professional Developers Conference Summary", 1996.
U.S. Appl. No. 09/573,656, Notice of Allowance mailed Apr. 28, 2004, 8 pages.
U.S. Appl. No. 09/574,144, Amendment and Response filed Dec. 8, 2003, 21 pages.
U.S. Appl. No. 09/574,144, Final Rejection mailed Jan. 6, 2004, 5 pages.
U.S. Appl. No. 09/574,144, Non-Final Rejection mailed Sep. 8, 2003, 16 pages.
U.S. Appl. No. 09/574,144, Notice of Allowance mailed Feb. 18, 2004, 3 pages.
U.S. Appl. No. 09/573,768, Amendment and Response filed Feb. 10, 2004, (30 pages).
U.S. Appl. No. 09/573,768, Amendment and Response filed Aug. 8, 2005, (20 pages).
U.S. Appl. No. 09/573,768, Non-Final Rejection mailed Apr. 8, 2005, (20 pages).
U.S. Appl. No. 09/573,768, Non-Final Rejection mailed Nov. 10, 2003, (15 pages).
U.S. Appl. No. 09/573,768, Notice of Allowance mailed May 3, 2004, (7 pages).
U.S. Appl. No. 09/573,768, Notice of Allowance mailed Nov. 3, 2005, (7 pages).
U.S. Appl. No. 09/573,769, Amendment and Response filed Mar. 10, 2004, (20 pages).
U.S. Appl. No. 09/573,769, Amendment and Response filed Oct. 23, 2003, (25 pages).
U.S. Appl. No. 09/573,769, Final Rejection mailed May 10, 2004, (13 pages).
U.S. Appl. No. 09/573,769, Non-Final Rejection mailed Jul. 23, 2003, (10 pages).
U.S. Appl. No. 09/573,769, Non-Final Rejection mailed Dec. 8, 2003, (11 pages).
U.S. Appl. No. 09/573,769, Notice of Allowance mailed Sep. 30, 2004, (4 pages).
U.S. Appl. No. 09/573,769, Response After Final Action filed Aug. 10, 2004, (10 pages).

(56) References Cited

OTHER PUBLICATIONS

U.S. Appl. No. 09/875,324, Amendment after Notice of Allowance filed Dec. 11, 2008, 2 pages.
U.S. Appl. No. 09/876,689, Amendment and Response, filed May 3, 2004, [15 pages.].
U.S. Appl. No. 09/876,689, Amendment and Response, filed Nov. 1, 2004, [8 pages].
U.S. Appl. No. 09/876,689, Non-Final Rejection, mailed Feb. 2, 2004, [9 pages].
U.S. Appl. No. 09/876,689, Non-Final Rejection, mailed Aug. 4, 2004, [6 pages].
U.S. Appl. No. 09/876,689, Notice of Allowance, mailed Mar. 23, 2005, [4 pages].
U.S. Appl. No. 09/876,689, Notice of Allowance, mailed Jun. 17, 2005, [2 pages].
U.S. Appl. No. 09/876,689, Notice of Allowance, mailed Dec. 15, 2004, [4 pages].
U.S. Appl. No. 09/899,539, Advisory Action mailed Jul. 14, 2008, (3 pages).
U.S. Appl. No. 09/899,539, Advisory Action mailed Aug. 3, 2006, (3 pages).
U.S. Appl. No. 09/899,539, Amendment and Response filed Feb. 1, 2007, (14 pages).
U.S. Appl. No. 09/899,539, Amendment and Response filed Feb. 18, 2005, (14 pages).
U.S. Appl. No. 09/899,539, Amendment and Response filed Feb. 28, 2006, (14 pages).
U.S. Appl. No. 09/899,539, Amendment and Response filed Mar. 9, 2009, (14 pages).
U.S. Appl. No. 09/899,539, Amendment and Response filed Jun. 13, 2007, (13 pages).
U.S. Appl. No. 09/899,539, Amendment and Response filed Jul. 3, 2008, (12 pages).
U.S. Appl. No. 09/899,539, Amendment and Response filed Jul. 24, 2006, (12 pages).
U.S. Appl. No. 09/899,539, Amendment and Response filed Sep. 9, 2005, (10 pages).
U.S. Appl. No. 09/899,539, Amendment and Response filed Dec. 30, 2007, (14 pages).
U.S. Appl. No. 09/899,539, Final Rejection mailed Apr. 3, 2008, (17 pages).
U.S. Appl. No. 09/899,539, Final Rejection mailed Apr. 13, 2007, (11 pages).
U.S. Appl. No. 09/899,539, Final Rejection mailed May 23, 2006, (15 pages).
U.S. Appl. No. 09/899,539, Final Rejection mailed May 25, 2005, (12 pages).
U.S. Appl. No. 09/899,539, Non-Final Rejection mailed Jul. 30, 2007, (11 pages).
U.S. Appl. No. 09/899,539, Non-Final Rejection mailed Oct. 18, 2004, (11 pages).
U.S. Appl. No. 09/899,539, Non-Final Rejection mailed Nov. 1, 2006, (13 pages).
U.S. Appl. No. 09/899,539, Non-Final Rejection mailed Nov. 28, 2005, (13 pages).
U.S. Appl. No. 09/899,539, Non-Final Rejection mailed Dec. 9, 2008, (20 pages).
U.S. Appl. No. 09/899,539, Notice of Allowance mailed Jul. 1, 2009, (9 pages).
U.S. Appl. No. 09/934,122, Amendment and Response filed Feb. 21, 2006, 24 pages.
U.S. Appl. No. 09/934,122, Amendment and Response filed Apr. 13, 2005, 8 pages.
U.S. Appl. No. 09/934,122, Amendment and Response filed May 19, 2006, 8 pages.
U.S. Appl. No. 09/934,122, Amendment and Response filed Sep. 30, 2005, 8 pages.
U.S. Appl. No. 09/934,122, Amendment and Response filed Nov. 9, 2006, 17 pages.
U.S. Appl. No. 09/934,122, Notice of Allowance mailed Jan. 5, 2007, 7 pages.
U.S. Appl. No. 09/934,122, Notice of Allowance mailed Feb. 15, 2008, 7 pages.
U.S. Appl. No. 09/934,122, Notice of Allowance mailed May 29, 2007, 7 pages.
U.S. Appl. No. 09/934,122, Notice of Allowance mailed Oct. 17, 2007, 7 pages.
U.S. Appl. No. 09/989,562, Advisory Action mailed May 2, 2007, 3 pages.
U.S. Appl. No. 09/989,562, Advisory Action mailed Dec. 16, 2005, 3 pages.
U.S. Appl. No. 09/989,562, Amendment and Response filed Jan. 7, 2008, 4 pages.
U.S. Appl. No. 09/989,562, Amendment and Response filed Mar. 30, 2007, 11 pages.
U.S. Appl. No. 09/989,562, Amendment and Response filed Apr. 13, 2005, 13 pages.
U.S. Appl. No. 09/989,562, Amendment and Response filed Sep. 30, 2005, 12 pages.
U.S. Appl. No. 09/989,562, Amendment and Response filed Oct. 19, 2006, 11 pages.
U.S. Appl. No. 09/989,562, Notice of Allowance mailed Apr. 17, 2008, 5 pages.
U.S. Appl. No. 09/989,562, Notice of Allowance mailed May 5, 2008, 1 page.
U.S. Appl. No. 10/269,072, Amendment and Response filed Jan. 30, 2007, 14 pages.
U.S. Appl. No. 10/269,072, Amendment and Response filed Feb. 9, 2006, 16 pages.
U.S. Appl. No. 10/269,072, Amendment and Response filed Apr. 4, 2008, 16 pages.
U.S. Appl. No. 10/269,072, Amendment and Response filed May 2, 2008, 16 pages.
U.S. Appl. No. 10/269,072, Amendment and Response filed May 9, 2006, 14 pages.
U.S. Appl. No. 10/269,072, Amendment and Response filed Aug. 19, 2005, 13 pages.
U.S. Appl. No. 10/269,072, Amendment and Response filed Sep. 14, 2006, 15 pages.
U.S. Appl. No. 10/269,072, Amendment and Response filed Oct. 19, 2007, 14 pages.
U.S. Appl. No. 10/269,072, Non-Final Office Action mailed May 28, 2008, 6 pages.
U.S. Appl. No. 10/269,072, Notice of Allowance mailed Mar. 30, 2009, 8 pages.
U.S. Appl. No. 10/692,765, Amendment and Response filed May 15, 2009, (8 pages).
U.S. Appl. No. 10/692,765, Advisory Action mailed Dec. 27, 2007, (3 pages).
U.S. Appl. No. 10/692,765, Amendment and Response filed Apr. 11, 2007, (15 pages).
U.S. Appl. No. 10/692,765, Amendment and Response filed Oct. 17, 2008, (9 pages).
U.S. Appl. No. 10/692,765, Amendment and Response filed Nov. 5, 2007, (12 pages).
U.S. Appl. No. 10/692,765, Final Rejection mailed Jul. 3, 2007, (19 pages).
U.S. Appl. No. 10/692,765, Non-Final Rejection mailed Jan. 11, 2007, (17 pages).
U.S. Appl. No. 10/692,765, Non-Final Rejection mailed Apr. 18, 2008, (13 pages).
U.S. Appl. No. 10/692,765, Non-Final Rejection mailed Dec. 15, 2008, (11 pages).
U.S. Appl. No. 10/692,765, Notice of Allowance mailed Jul. 15, 2009, (6 pages).
U.S. Appl. No. 10/818,684, Amendment and Response, filed Nov. 9, 2005, [13 pages].
U.S. Appl. No. 10/818,684, Non-Final Rejection, mailed Aug. 9, 2005, [9 pages].
U.S. Appl. No. 10/818,684, Notice of Allowance, mailed Mar. 21, 2006, [11 pages].

(56) References Cited

OTHER PUBLICATIONS

U.S. Appl. No. 10/840,965, Amendment and Response filed Feb. 28, 2008, 9 pages.
U.S. Appl. No. 10/840,965, Amendment and Response filed Mar. 23, 2009, 19 pages.
U.S. Appl. No. 10/840,965, Amendment and Response filed Sep. 8, 2009, 16 pages.
U.S. Appl. No. 10/840,965, Amendment and Response filed Sep. 22, 2008, 15 pages.
U.S. Appl. No. 10/840,965, Ex Parte Quayle Action mailed Dec. 8, 2009 mailed Dec. 8, 2009, 5 pages.
U.S. Appl. No. 10/840,965, Final Office Action mailed Dec. 23, 2008, 21 pages.
U.S. Appl. No. 10/840,965, Non-Final Office Action mailed Jun. 8, 2009, 18 pages.
U.S. Appl. No. 10/840,965, Notice of Allowance mailed Apr. 2, 2010, 6 pages.
U.S. Appl. No. 10/840,965, Notice of Allowance mailed Oct. 5, 2010, 6 pages.
U.S. Appl. No. 10/840,965, Response after Ex Parte Quayle Action filed Feb. 8, 2010, 13 pages.
U.S. Appl. No. 10/843,543, Amendment and Response filed Jun. 26, 2009, [15 pages].
U.S. Appl. No. 10/843,543, Amendment and Response, filed Feb. 26, 2010, [15 pages].
U.S. Appl. No. 10/843,543, Amendment and Response, filed Mar. 17, 2008, [14 pages].
U.S. Appl. No. 10/843,543, Amendment and Response, filed Dec. 30, 2010, [15 pages].
U.S. Appl. No. 10/843,543, Appeal Brief, filed Aug. 5, 2011, [40 pages].
U.S. Appl. No. 10/843,543, Applicant Arguments, filed Nov. 6, 2008, [13 pages].
U.S. Appl. No. 10/843,543, Examiner's Answer to Appeal Brief, mailed Nov. 23, 2011, [16 pages].
U.S. Appl. No. 10/843,543, Final Rejection, mailed Feb. 25, 2011, [15 pages].
U.S. Appl. No. 10/843,543, Final Rejection, mailed Jun. 6, 2008, [16 pages].
U.S. Appl. No. 10/843,543, Final Rejection, mailed Oct. 26, 2009, [13 pages].
U.S. Appl. No. 10/843,543, Non-Final Rejection, mailed Jan. 26, 2009, [11 pages].
U.S. Appl. No. 10/843,543, Non-Final Rejection, mailed Jul. 2, 2010, [12 pages].
U.S. Appl. No. 10/843,543, Non-Final Rejection, mailed Nov. 15, 2007, [14 pages].
U.S. Appl. No. 10/843,543, Reply Brief, filed Jan. 23, 2012, [14 pages].
U.S. Appl. No. 10/845,639, Advisory Action, mailed Nov. 13, 2009, [3 pages].
U.S. Appl. No. 10/845,639, Advisory Action, mailed Nov. 18, 2008, [3 pages].
U.S. Appl. No. 10/845,639, Amendment and Response, filed Jan. 25, 2013, [17 pages].
U.S. Appl. No. 10/845,639, Amendment and Response, filed Apr. 23, 2010, [20 pages].
U.S. Appl. No. 10/845,639, Amendment and Response, filed May 8, 2008, [20 pages].
U.S. Appl. No. 10/845,639, Amendment and Response, filed May 18, 2009, [16 pages].
U.S. Appl. No. 10/845,639, Amendment and Response, filed Jun. 21, 2011, [15 pages].
U.S. Appl. No. 10/845,639, Amendment and Response, filed Oct. 30, 2009, [17 pages].
U.S. Appl. No. 10/845,639, Amendment and Response, filed Nov. 24, 2010. [16 pages].
U.S. Appl. No. 10/845,639, Amendment and Response, filed Dec. 2, 2008, [12 pages].
U.S. Appl. No. 10/845,639, Final Rejection, mailed Jul. 31, 2009, [16 pages].
U.S. Appl. No. 10/845,639, Final Rejection, mailed Aug. 3, 2010, [15 pages].
U.S. Appl. No. 10/845,639, Final Rejection, mailed Sep. 2, 2008, [14 pages].
U.S. Appl. No. 10/845,639, Final Rejection, mailed Nov. 21, 2011, [18 pages].
U.S. Appl. No. 10/845,639, Non-Final Rejection, mailed Feb. 8, 2008, 19 pages.
U.S. Appl. No. 10/845,639, Non-Final Rejection, mailed Feb. 18, 2009, [12 pages].
U.S. Appl. No. 10/845,639, Non-Final Rejection, mailed Apr. 13, 2011, [18 pages].
U.S. Appl. No. 10/845,639, Non-Final Rejection, mailed Oct. 23, 2012, [21 pages].
U.S. Appl. No. 10/845,639, Non-Final Rejection, mailed Dec. 23, 2009, [13 pages].
U.S. Appl. No. 10/845,639, Notice of Allowance, mailed Feb. 26, 2014, [5 pages].
U.S. Appl. No. 10/845,639, Notice of Allowance, mailed Sep. 30, 2013, [8 pages].
U.S. Appl. No. 10/845,639, Response, filed Feb. 8, 2012, [16 pages].
U.S. Appl. No. 10/845,639, Response, filed Nov. 3, 2008, [12 pages].
U.S. Appl. No. 10/846,496, Amendment and Response, filed Jul. 5, 2007, [12 pages].
U.S. Appl. No. 10/846,496, Non-Final Rejection, mailed Apr. 5, 2007, [16 pages].
U.S. Appl. No. 10/846,496, Amendment and Response, filed Jan. 7, 2009, [15 pages].
U.S. Appl. No. 10/846,496, Amendment and Response, filed Mar. 1, 2010, [14 pages].
U.S. Appl. No. 10/846,496, Amendment and Response, filed Jul. 7, 2008, [12 pages].
U.S. Appl. No. 10/846,496, Amendment and Response, filed Jul. 30, 2009, [15 pages].
U.S. Appl. No. 10/846,496, Amendment and Response, filed Dec. 23, 2010, [16 pages].
U.S. Appl. No. 10/846,496, Final Rejection, mailed Mar. 31, 2009, [23 pages].
U.S. Appl. No. 10/846,496, Final Rejection, mailed Apr. 4, 2008, [19 pages].
U.S. Appl. No. 10/846,496, Final Rejection, mailed Jun. 23, 2010, [25 pages].
U.S. Appl. No. 10/846,496, Non-Final Rejection, mailed Oct. 7, 2008, [19 pages].
U.S. Appl. No. 10/846,496, Non-Final Rejection, mailed Oct. 27, 2009, [22 pages].
U.S. Appl. No. 10/846,496, Notice of Allowance, mailed Mar. 17, 2011, [9 pages].
U.S. Appl. No. 10/847,648, Amendment and Response filed Oct. 18, 2007, (19 pages).
U.S. Appl. No. 10/847,648, Amendment and Response filed Apr. 8, 2008, (16 pages).
U.S. Appl. No. 10/847,648, Final Rejection mailed Jan. 8, 2008, (12 pages).
U.S. Appl. No. 10/847,648, Non-Final Rejection mailed Jun. 18, 2007, (12 pages).
U.S. Appl. No. 10/847,648, Notice of Allowance mailed Aug. 7, 2008, (20 pages).
U.S. Appl. No. 10/857,657, Amendment and Response filed Nov. 24, 2008, (10 pages).
U.S. Appl. No. 10/857,657, Amendment and Response filed Apr. 28, 2008, (12 pages).
U.S. Appl. No. 10/857,657, Non-Final Rejection mailed Jul. 24, 2008, (12 pages).
U.S. Appl. No. 10/857,657, Non-Final Rejection mailed Dec. 28, 2007, (15 pages).
U.S. Appl. No. 10/857,657, Notice of Allowance mailed Feb. 24, 2009, (6 pages).
U.S. Appl. No. 10/857,724, Advisory Action mailed Jun. 18, 2007, (3 pages).

(56) References Cited

OTHER PUBLICATIONS

U.S. Appl. No. 10/857,724, Amendment and Response filed Jan. 3, 2007, (17 pages).
U.S. Appl. No. 10/857,724, Amendment and Response filed Jan. 16, 2009, (23 pages).
U.S. Appl. No. 10/857,724, Amendment and Response filed Jun. 30, 2008, (18 pages).
U.S. Appl. No. 10/857,724, Amendment and Response filed Dec. 12, 2007, (19 pages).
U.S. Appl. No. 10/857,724, Final Rejection mailed Apr. 2, 2007, (13 pages).
U.S. Appl. No. 10/857,724, Final Rejection mailed Oct. 16, 2008, (18 pages).
U.S. Appl. No. 10/857,724, Non-Final Rejection mailed Mar. 31, 2008, (12 pages).
U.S. Appl. No. 10/857,724, Non-Final Rejection mailed Apr. 1, 2009, (17 pages).
U.S. Appl. No. 10/857,724, Non-Final Rejection mailed Oct. 3, 2006, (18 pages).
U.S. Appl. No. 10/857,724, Response After Final Action filed Jun. 4, 2007, (18 pages).
U.S. Appl. No. 10/966,618, Amendment and Response filed Feb. 9, 2007, (7 pages).
U.S. Appl. No. 10/966,618, Amendment and Response filed Jun. 16, 2006, (12 pages).
U.S. Appl. No. 10/966,618, Amendment and Response filed Jun. 20, 2007, (9 pages).
U.S. Appl. No. 10/966,618, Amendment and Response filed Sep. 30, 2005, (27 pages).
U.S. Appl. No. 10/966,618, Final Rejection mailed Aug. 9, 2006, (10 pages).
U.S. Appl. No. 10/966,618, Non-Final Rejection mailed Feb. 22, 2007, (9 pages).
U.S. Appl. No. 10/966,618, Non-Final Rejection mailed Jul. 18, 2005, (9 pages).
U.S. Appl. No. 10/966,618, Non-Final Rejection mailed Dec. 16, 2005, (9 pages).
U.S. Appl. No. 10/966,618, Notice of Allowance mailed Aug. 31, 2007, (3 pages).
U.S. Appl. No. 11/165,416, Notice of Allowance mailed Jan. 12, 2007, 6 pages.
U.S. Appl. No. 11/165416, Notice of Allowance mailed Dec. 10, 2007, 4 pages.
U.S. Appl. No. 11/184,094, Amendment and Response, filed Jun. 8, 2012, [17 pages].
U.S. Appl. No. 11/184,094, Amendment and Response, filed Jun. 14, 2010, [13 pages].
U.S. Appl. No. 11/184,094, Amendment and Response, filed Jun. 17, 2011, [13 pages].
U.S. Appl. No. 11/184,094, Amendment and Response, filed Jul. 1, 2009, [13 pages].
U.S. Appl. No. 11/184,094, Amendment and Response, filed Dec. 7, 2011, [16 pages].
U.S. Appl. No. 11/184,094, Amendment and Response, filed Dec. 22, 2009, [14 pages].
U.S. Appl. No. 11/184,094, Final Rejection, mailed Mar. 17, 2010, [19 pages].
U.S. Appl. No. 11/184,094, Final Rejection, mailed Aug. 3, 2012, [18 pages].
U.S. Appl. No. 11/184,094, Final Rejection, mailed Sep. 1, 2011, [11 pages].
U.S. Appl. No. 11/184,094, Non-Final Rejection, mailed Feb. 8, 2012, [16 pages].
U.S. Appl. No. 11/184,094, Non-Final Rejection, mailed Mar. 31, 2011, [13 pages].
U.S. Appl. No. 11/184,094, Non-Final Rejection, mailed Apr. 1, 2009, [9 pages].
U.S. Appl. No. 11/184,094, Non-Final Rejection, mailed Oct. 5, 2009, [16 pages].
U.S. Appl. No. 10/856,578, Amendment and Response, filed Jan. 20, 2009, [14 pages].
U.S. Appl. No. 10/856,578, Amendment and Response, filed Feb. 19, 2010, [17 pages].
U.S. Appl. No. 10/856,578, Amendment and Response, filed Jun. 24, 2008, [14 pages].
U.S. Appl. No. 10/856,578, Final Rejection, mailed Aug. 18, 2008, [14 pages].
U.S. Appl. No. 10/856,578, Final Rejection, mailed Nov. 19, 2009, [22 pages].
U.S. Appl. No. 10/856,578, Non-Final Rejection, mailed Mar. 24, 2008, [12 pages].
U.S. Appl. No. 10/856,578, Non-Final Rejection, mailed Apr. 15, 2009, [15 pages].
U.S. Appl. No. 10/856,578, Non-Final Rejection, mailed Oct. 25, 2010, [19 pages].
U.S. Appl. No. 10/856,578, Amendment and Response, filed Feb. 24, 2011, [16 pages].
U.S. Appl. No. 10/856,578, Amendment and Response, filed Jul. 15, 2009, [17 pages].
U.S. Appl. No. 10/856,578, Amendment and Response, filed Sep. 16, 2011, [14 pages].
U.S. Appl. No. 10/856,578, Final Rejection mailed Mar. 17, 2011, [20 pages].
U.S. Appl. No. 10/856,578, Notice of Allowance, mailed Dec. 23, 2011, [8 pages].
Xiong, Mong et al. "Mirror: a state-conscience concurrency control protocol for replicated real time databases", Information systems 27, 2002 (pp. 277-297).
R. McCool, "NCSA http," Documentation distributed with the NCSA http Web server, NCSA httpd Development Team, pp. 1-4 (1994). [Unable to Locate].
Spencer, Ken. "Beyond the Browser, The 1st Installment: Page Object of ASP," Microsoft Interactive Developer, No. 11, pp. 116-118, ASCII Corporation, Japan, Jan. 18, 1999. [Unable to Locate].
SNAP Using the SNAP Language, Template Software, Chapter 7, published 1997. [Unable to Locate].
European Application No. 01111679.5, Communication mailed Nov. 25, 2014, 4 pages.
"A Brief History of Hypertext", from Microsoft Corporation © 1996.
"Alterego Networks Introduces First Mobile Web Server for Enterprises, Telcos and Providers"; Redwood City, CA; Nov. 14, 2000; 3 pages.
"Best Practices for Creating Adaptive User Interfaces with the Mobile Internet Toolkit"; Microsoft Corporation, Jan. 2002; 15 pages.
"Best Practices for the Microsoft Mobile Internet Toolkit Image Control"; Microsoft Corporation, Feb. 2002.
"Bluestone Software Layes Foundation for Internet Operating Environment with Total-E-Server . . ." Screaming Media, Business Wire; Jun. 5, 2000; 3 pages.
"Developing ASP-Based Applications" from Microsoft Corporation © 1996.
"HTML Encyclopaedia"; http://www.scit.wlv.ac.uk/encyc/form.html; 2 pages.
"HTTP Made Really Easy—A Practical Guide to Writing Clients and Servers", by Marshall, Aug. 15, 1997.
Anderson, Richard; Homer, Alex; Howard, Rob; Sussman, Dave; "A Preview of Activer Server Pages+"; Copyright 2000, Wrox Press, pp. 1-73.
Article, ColdFusion Web Application Server, update and summary, from Allaire Corp—www@allaire.com.
Chapter 3, "Mechanics of Developing JavaScript Applications," Server-Side Javascript Guide, 'Online! 1999, pp. 51-108, www.Developer.netscape.com/docs/manuals, ssjs/1_4/ssjs.pdf>.
Chapter 6, "Session Management Service," Server-Side Javascript Guide, 'Online! 1999, pp. 125-166, www.developer.netscape.com/docs/manuals/ssjs/1_4/ssjs.pdf>.
Custer, Helen; "Inside Windows NT"; Microsoft Press 1993; pp. 74-81.
Davulcu, Hasan; Freire, Juliana; Kifer, Michael; Ramakrishnan, I.V.; "A Layered Architecture for Querying Dynamic Web Content"; ACM 1999; pp. 491-502.

(56) References Cited

OTHER PUBLICATIONS

Dobson, R., "Data Binding in Dynamic HTML," DBMS MAG, 'Online! Mar. 1998 (Mar. 1983) pp. 47-52.
Dowd, Tyson et al., "Compiling Mercury to the .NET Common Language Runtime," Electronic Notes in Theoretical Computer Sciences 59 No. 1 (Netherlands) (2001), pp. 1-16.
Duan, Nick N.; "Distributed Database Access in a Corporate Environment Using Java" Bell Atlantic Corporation; 1996; 8 pages.
Esposito, Dino, "Heaven sent," Developer Network Journal, Mar.-Apr. 2001, Matt Publishing, UK, No. 23, pp. 18-24.
Franklin, K., "Supercharge Data Binding," Visual Basic Programmer's Journal, Mar. 2000, Fawcette Technical Publications, vol. 10, No. 3, pp. 32-33, 39-40, 42, 44, 46.
Frost, Jim: "Windows NT Security"; May 4, 1995; 7 pages; http://world.std.com/~jimf/papers/nt-security/nt-security.html.
Hammock swings through Web Interfaces (3 pages) by Eric Hammond.
Hammock(TM), Think of it as Swing(TM) for the Web (10 pages).
Hannay, Phillip et al., "MSIL for the .NET Framework: The Next Battleground?", Virus Bulletin Conference, Sep. 2001, pp. 173-196.
Holmes, John W.; e-Mail response to question regarding GET/POST HTTP request, extracted from Google's News Groups, php.general, Nov. 11, 2002.
Hovanes, Michael E.; Deal, John R. Grizz; Rowberg, Alan H.; "Seamless Multiresolution Display of Portable Wavelet-Compressed Images" Journal of Digital Imaging, vol. 12, No. 2 suppl 1 (May), 1999, pp. 109-111.
Ingham, David B.; "W3Objects: A Distributed Object-Oriented Web Server" Object-Oriented Web Servers and data Modeling Workshop, Sixth International World Wide Web Conference, Apr. 7, 1997, Santa Clara, CA 4 pages.
Kitayama, Fumihiko; Hirose, Shin-Ichi; Kondoh, Goh; Kuse, Kazushi; "Design of a Framework for Dynamic Content Adaptation to Web-Enabled Terminals and Enterprise Applications"; IEEE 1999, pp. 72-79.
Kunz, T.; El Shentenawy, M.; Gaddah, A.; Hafez, R.; Image Transcoding for Wireless WWW Access: The User Perspective; Multimedia Computing and Networking 2002, Proceedings of SPIE vol. 467 (2002) pp. 28-33.
Langheinrich, M., et al., "Unintrusive customization techniques for Web advertising," Computer Networks, vol. 31, No. 11-16. May 17, 1999, pp. 1259-1272.
Lee, C.-H., et al., "Web personalization expert with combining collaborative filtering and association rule mining technique," Expert Systems With Applications, Vo. 21, No. 3, Oct. 2001, pp. 131-137.
Li, W.-S., et al., "PowerBookmarks: a system for personalizable Web information organization, sharing, and management," Computer Networks, vol. 31, No. 11-16, May 17, 1999, pp. 1375-1389.

Mobasher, B., "A Web personalization Engine Based on User Transaction Clustering," Proc. Of the 9th Annual Workshop on Information Tech. And Systems, Dec. 11, 1999, pp. 179-184.
Nadamoto, Akiyo; Kondo, Hiroyuki; Tanaka, Katsumi; "WebCarousel: Restructuring Web Search Results for Passive Viewing in Mobile Environments" IEEE 2001 p. 164-165.
"NCSA httpd" nttpd@ncsa.uiuc.edu.
O'Leary, M., "Web personalization Does It Your Way," O'Leary Online, vol. 23, No. 2, Mar.-Apr. 1999, pp. 79-80.
OOP Launches Hammock at JavaOne (1 page).
Penn, Gerald; Hu Jianying; Luo, Hengbin; McDonald, Ryan; "Flexible Web Document Analysis for Deliver to Narrow-Bandwidth Devices"; IEEE 2001; pp. 1074-1078.
Pyarali, Irfan; O'Ryan, Carlos; Schmidt, Douglas; Wang, Nanbor; Gokhale, Aniruddha S.; Kachroo, Vishal; "Using Priciple Patterns to Optimize Real-Time ORB's" IEEE Concurrency, 2000, pp. 16-25.
Ramakrishnan, N., "PIPE: Web Personalization by Partial Evaluation," IEEE Internet Computing, vol. 4, No. 6, Nov.-Dec. 2000, pp. 21-31.
Seddon, Bill, "Generating XP Style webparts from a web control," The Code Project—Generating XP style webparts from a web control—ASP.NET, online at http://www.codeproject.com/aspnet/webpartscontrol.asp, retrieved Apr. 8, 2004, 10 pages.
Sells, Chris et al., "Generating Code at Run Time with Reflection. Emit," Windows Developer Magazine, Aug. 2002, vol. 13, No. 8, pp. 26-34.
Shapiro, M., "A Binding Protocol for Distributed Shared Objects," Proceedings of the International Conference on Distributed Computing Systems, Poznan, Poland, Jun. 21-24, 1994, Los Alamitos, IEEE Comp. Soc. Press.
Shi, Weisong; Collins, Eli; Karamcheti, Vijay; "Modeling Object Characteristics of Dynamic Web Content"; Proceedings of the IEEE Global Internet Conference, Nov. 2002, 5 pgs.
Solomon, David A. "Inside Windows NT, Second Edition"; Microsoft Press 1998; pp. 310-319.
Stewart, Tony: "The Document as Application: Issues and Implications" GCA XML Europe 1999; pp. 575-599.
Syme, Don, "ILX: Extending the .NET Common IL for Functional Language Interoperability," Electronic Notes in Theoretical Computer Science 59 No. 1 (2001), pp. 1-20.
Varela, Carlos A.; Caroline C. Hayes; "Providing Data on the Web: From Examples to Programs," Second International WWW Conference, Chicago, IL; Oct. 17, 1994; 17 pages.
Wu, Dapeng; Hou, Yiwei Thomas-Zhang, Ya-Qin; "Scalable Video Transport over Wireless IP Networks"; IEEE 2000; pp. 1185-1191.
U.S. Appl. No. 10/843,543, Patent Board Decision mailed Nov. 21, 2014, 13 pages.

* cited by examiner

SYSTEMS AND METHODS FOR PERSISTING DATA BETWEEN WEB PAGES

TECHNICAL FIELD

This systems and methods discussed herein relate to web content management.

BACKGROUND OF THE INVENTION

In the past, pages in the World Wide Web (Web) essentially contain only static content written in procedural codes using hyper text markup language (HTML). These web pages are stored on servers connected through the Internet. Each web page is associated with a uniform resource locator (URL) and a user/client can browse to a particular web page by requesting the web page from a server using the URL corresponding to the page. Some traditional web pages allow users to post data to another page using standard HTML input methods, such as forms. To post the data, a user must activate a trigger (e.g. a button) on the page to send the data to a process on the server, such as a common gateway interface (CGI) program. Particularly, the data is appended to the end of the URL associated with the process. The process may use the submitted data to generate another page.

The methods of posting data on traditional web pages have many deficiencies. For example, although a user can post data to a server, the data can only include actual values as part of the request or appended to the end of a URL as a text string. This method of posting data lacks the ability to send complex objects that cannot be properly represented by plain text. Also, the "posted to" web page must be regenerated for each post request. So, if a programmer would like to use input from the user on a particular web page to generate content on another related web page, the programmer must create a process to parse the web request or URL for the actual values submitted by the user on the original web page and to generate the other web page using the submitted values, without having the abilities to reuse features and complex data objects on the original web page.

Thus, there is a need for an efficient technique to persist data between web pages that does not require the storage of a large amount of data on the server for each web page and the complete regeneration of a web page in response to a posting request.

SUMMARY OF THE INVENTION

The systems and methods described herein are directed at persisting data between web pages. A server receives user inputs and object-related data associated with a first web page and a request for posting to a second web page from a client. The object-related data includes information about the objects in the first web page. Instances of the objects associated with the first web page are reconstructed based, at least in part, on the object-related data and user inputs. The server generates rendering data of the second web page based, at least in part, on the reconstructed object instances. In this manner, the object-related data is allowed to persist from the first web page to the second web page.

DETAILED DESCRIPTION

The systems and methods described herein provide an efficient technique to persist data between web pages. Each web page includes objects that may have various configurations, such as properties, states and behaviors. A server determines object-related data for representing the configurations of the objects in the web page and sends the rendering data for the web page and the object-related data to the requesting client. The client may post from the original web page to another web page with input data. Posting from a first web page to a second web page means that an operation which client causes a call from first web page to the second web page on the server. For example, the client may issue to the server a request for the other web page along with posting data and the object-related data associated with the original web page. The server may instantiate the original web page using the object-related data to obtain the information from the original web page when generating the second web page. In this manner, object-related data may persist between web pages without being saved on a server. These and other aspects will be discussed in more detail in the description below.

Figure 1:
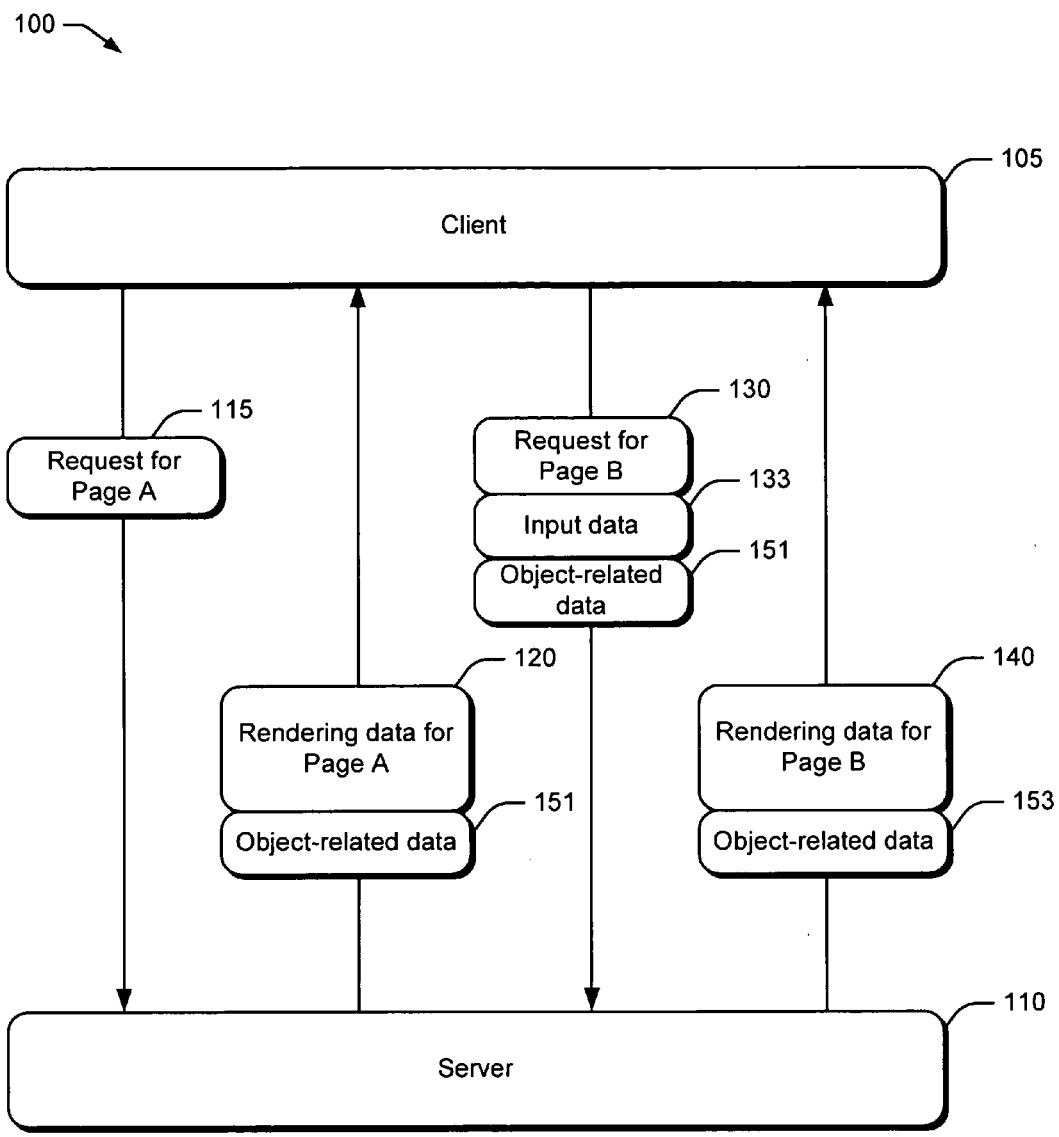
FIG. 1 is a schematic diagram of a system for persisting data between web pages.

FIG. 1 is a schematic diagram of a system 100 for persisting data between web pages. System 100 may include client 105 and server 110. Client 105 and server 110 may include any type of computing device, such as desktop and laptop computers, dedicated server computers, network appliances, personal digital assistant (PDA) devices, wireless phones, pagers, and the like. Client 105 is configured to enable users to request web pages. For example, client 105 is also configured to send a request 115 for a web page to server 110 and to render the web page for the users using data received from server 110. Particularly, the client 105 is configured to receive rendering data 120 for the requested web page and object-related data 151 from server 110. Object-related data 151 includes information about the objects in the requested web page. For example, object-related data 151 may include the configurations of the objects, such as states, properties and behaviors. Client 105 is configured to maintain object-related data 151. In response to a request to post to another web page from the original web page, client 105 is also configured to issue a request 130 to server 110 for the other web page along with object-related data 151. Request 130 may also include client input data 133 posted from the original web page.

Server 110 is configured to receive requests for web pages from client 105. Server 110 will be discussed in more detail in conjunction with FIG. 2. Briefly stated, server 110 generates web pages requested by client 105 using various objects. For example, server 110 may generate a particular web page by incorporating instances of the objects related to the web page and assigning the proper configurations, such as states, properties and behaviors, to those objects. Server 110 also creates object-related data associated with the objects. Server 110 is configured to send rendering data associated with the web page and the corresponding object-related data to the client.

Example communications between server 110 and client 105 will now be discussed in conjunction with FIG. 1 to further illustrate system 100 in operation. As shown in FIG. 1, client 105 issues a request 115 for Page A to server 110. The request may include the address of Page A, such as a uniform resource locator (URL). In response, server 110 generates rendering data for Page A 120 by incorporating various objects in the web page. Server 110 also creates object-related data 151, which includes information about the objects in Page A. Page A is configured to post to Page B under certain conditions, such as a user input. Server 110 then sends rendering data 120 and object-related data 151 to client 105.

Upon receiving rendering data 120 and object-related data 151 from server 110, client 105 may render Page A, such as displaying the page to a user. Client 105 may determine to post from Page A to Page B. For example, client 105 may receive a user input in Page A that causes a post to Page B. In response, client 105 issues a request 130 for Page B to server 110 along with object-related data 151 received from server 110. Client 105 may also include information about the user input in the request 130.

In response to receiving request 130 and object-related data 151, server 110 instantiates Page A using object-related data 151. For example, server 110 may reconstruct instances of objects in Page A 120 using object-related data 151. The reconstructed object instances include the configurations specified in object-related data 151. Server 110 may generate rendering data for Page B using the reconstructed objects in Page A and other objects not associated with Page A. Server 110 determines object-related data 153, which includes information about the objects in Page B. Server 110 then sends rendering data 140 and object-related data 153 to client 105.

It is to be appreciated that object-related data 151 persists from Page A to Page B without being saved in server 110. Persisting object-related data in this manner allows a web page to efficiently post to another web page, without requiring data storage on the server. This technique of persisting data also enables an original web page generated by one server to post to a requested web page generated by a second server while allowing the second server to access information about the objects in the original web page. The arrangement of multiple servers being configured to provide related web content is often referred to as a web farm. Typically, servers in a web farm have the necessary applications installed on them to implement the described technique.

Figure 2:
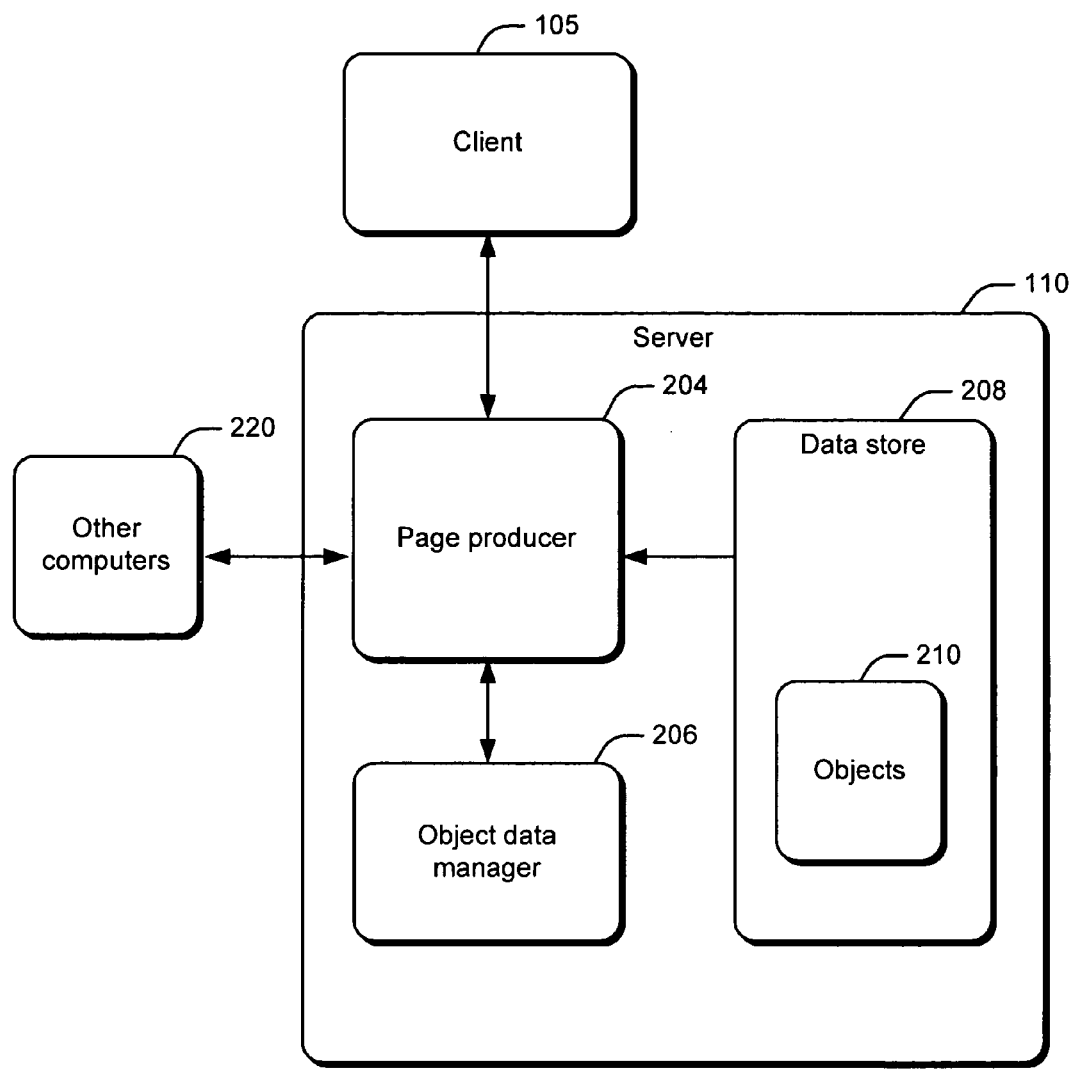
FIG. 2 is a schematic diagram of the server shown in FIG. 1.

FIG. 2 is a schematic diagram of server 110 shown in FIG. 1. As shown in FIG. 2, server 110 may include page producer 204, object data manager 206, and data store 208. The components in FIG. 2 are shown for illustrative purposes. In actual implementation, server 110 may include more, less, or different components than those shown in FIG. 2.

Data store 208 provides storage for information that is used by server 110 to generate web pages. Data store 208 may be implemented in any type of volatile or persistent memory device, such as random access memory (RAM), flash memory, optical or magnetic disk drive, hard drive, and the like. The information in data store 208 includes objects 210, which include both data and procedures for manipulating the data. Objects 210 are typically used by page producer 204 to generate web pages in an object-oriented manner. Web pages that are generated using objects 210 are more efficiently created than procedural based web pages. Such object-oriented web pages may also efficiently include dynamic content that is generated and updated in a real-time manner in response to requests. For example, objects 210 may be individually updated and incorporated in a web page, without changing other objects in the page. Web pages that are dynamically generated in such a manner provide a better user experience than web pages with only static content.

Page producer 204 is configured to provide web pages specified in requests from clients to server 110. To provide an enhanced user experience, page producer 204 may be configured to dynamically generate the requested web pages. Page producer 204 may generate web pages with objects 210 in data store 208. For example, page producer 204 may incorporate instances of objects 210 in the web page. Page producer 204 is configured to assign the appropriate configurations to objects 210 for incorporation. To enable program developers to construct web pages that provide a more cohesive user experience, page producer 204 is also configured to generate a web page that posts to other web pages.

Page producer 204 may also be configured to obtain information from other computers 220 to generate web pages. For example, a requested web page may include updated information that is provided by another server. Page producer 204 may obtain the information from another server in real time and dynamically generate the requested web page with the obtained information.

Object data manager 206 manages object-related data for server 110. Object data manager 206 is configured to determine object-related data associated with objects that are used by page producer 204 to generate a web page. For example, page producer 204 may include control objects in a particular web page. In response, object data manger 206 determines viewstate data related to the configurations of the control objects, such as their properties, states and behaviors. The viewstate data is sent by page producer 204 to the requesting client along with the rendering data for the web page.

Object data manager 206 is also configured to instantiate a web page from object-related data associated with the web page. Object data manager 206 typically instantiates a particular web page to obtain information for generating another web page posted from the original web page. Instantiating a web page includes reconstructing instances of objects in the web page using object-related data. For example, if the object-related data includes viewstate data associated with control objects in the original web page, object data manager 206 will reconstruct the control objects with the configurations specified in the object-related data. Page producer 204 may then use the reconstructed object instances to create the other web page posted from the original web page.

To enhance security, object data manger 206 is configured to use a message authentication code (MAC) to protect object-related data. A MAC is a secret key that is used to uniquely identify a message. A MAC may be uniquely assigned to a particular message or be derived based on the properties of the message. A MAC may be used in conjunction with an encryption mechanism to provide multiple layers of security. For example, object data manger 206 may encrypt object-related data using a hash function with a MAC as the encryption key. The MAC may be also included as part of the encrypted object-related data. Object data manger 206 is configured to use the MAC in the object-related data to determine whether the data is valid. For example, object data manager 206 may use a particular MAC to decrypt the object-related data. The decrypted object-related data includes a second MAC. If the first MAC and the second MAC do not match, the object-related data has likely been tempered and object data manger 206 would determine that the data is invalid.

Object data manger 206 is also configured to serialize object-related data for sending to the client. Object data manger 206 may serialize the object-related data in accordance with hyper text transfer protocol (HTTP) and send the serialized data to the client in an HTTP hidden field.

Figure 3:
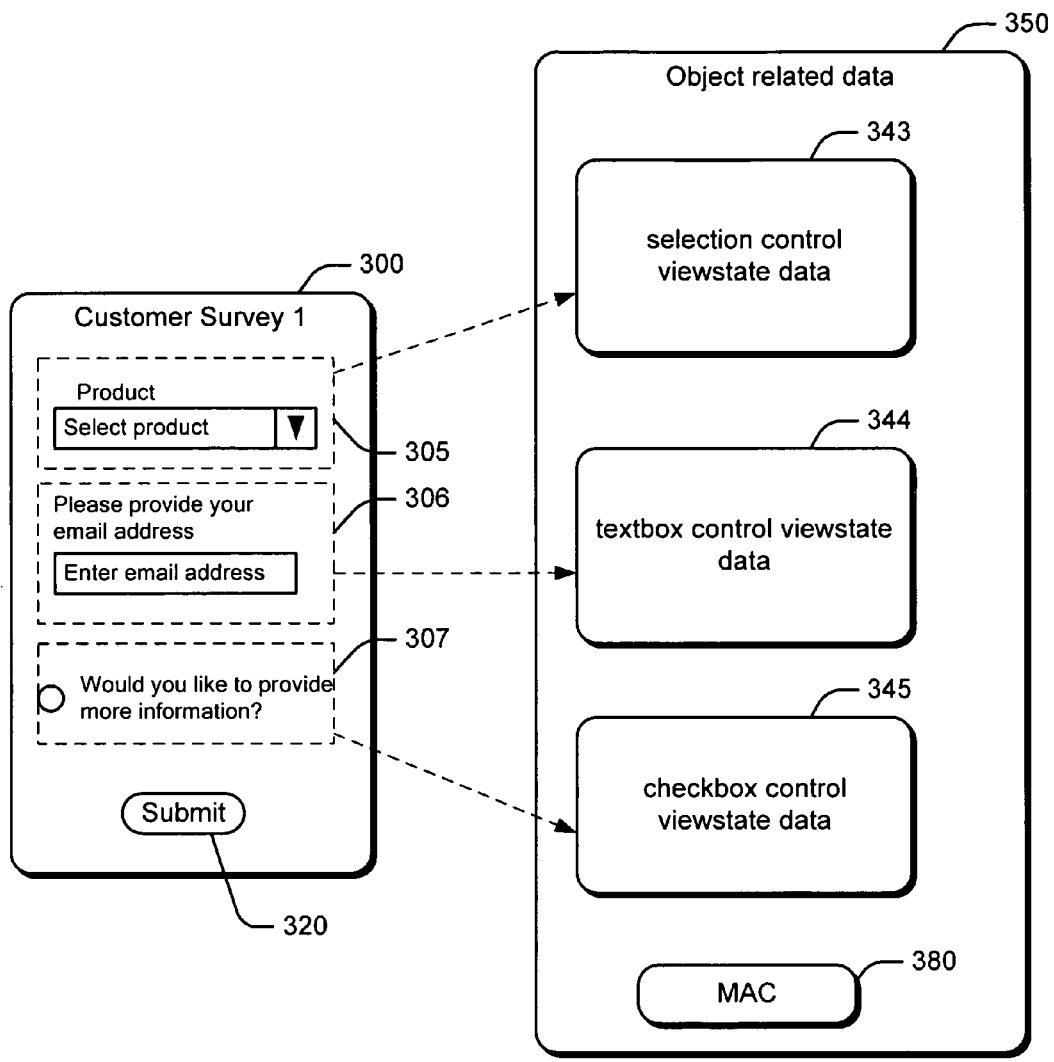
FIG. 3 is a schematic diagram of example data associated with an example web page sent by a server to a client.

FIG. 3 is a schematic diagram of example data associated with an example web page 300 sent by a server to a client. Example object-related data 350 is typically sent by the server in response to a request for example web page 300 issued by the client. Example web page 300 is related to a customer survey and includes selection control object 305, textbox control object 306 and checkbox control object 307. Object-related data 350 associated with web page 300 is sent from the server to the client along with rendering data for web page 300. As shown in FIG. 3, object-related data 350 includes selection control viewstate data 343, textbox control viewstate data 344 and checkbox control viewstate data 345. Viewstate data 343-345 are data about the configurations of control objects 305-307 in web page 300. For example, viewstate data 343-345 may include the layout, the selection choices and mechanisms, and the associated text for control objects 305-307. Object-related data 350 may include a message authentication code (MAC) 380 for security purposes. Object-related data 350 may also be encrypted with an encryption key, such as MAC 380.

Web page 300 may include submit button 320 that is configured to post input data to the next web page. In response to activating the submit button, the client sends the input data associated with control objects 305-307 to the server along with an address for the next web page and object-related data 350. The server may then use the input data and object-related data 350 to generate the next web page specified by the address.

Figure 4:
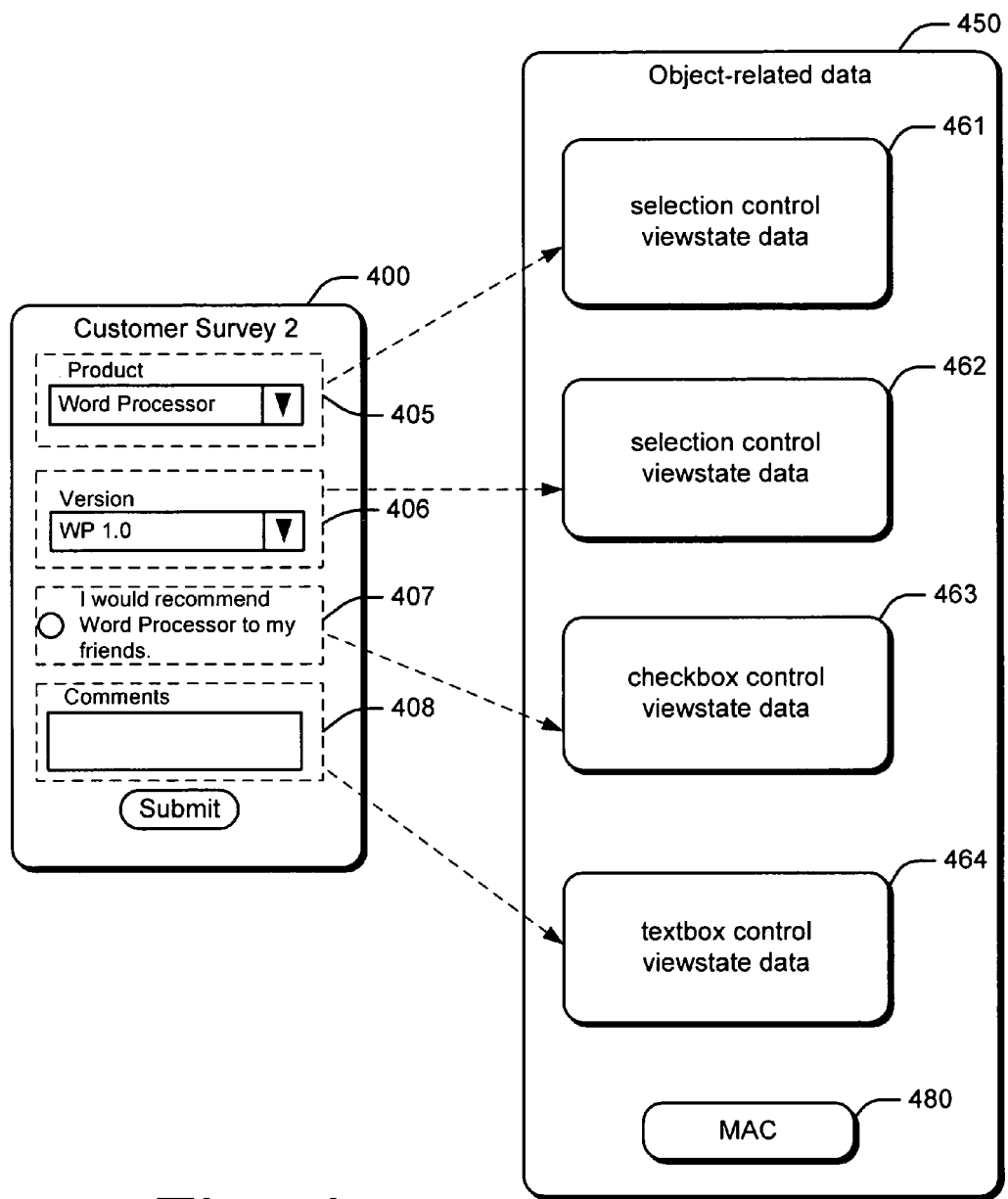
FIG. 4 is a schematic diagram of example data associated with another example web page.

FIG. 4 is a schematic diagram of example data associated with another example web page 400. Example object-related data 450 is typically sent by the server to the client in response to a post from the original web page 300 shown in FIG. 3. Example web page 400 is another page of the customer survey and includes selection control objects 405 and 406, checkbox control object 407, and textbox control object 408.

The server typically receives an address for web page 400 from the client along with input data from the original page 300 and object-related data 350. The server may instantiate web page 300 using object relate data 350 to obtain the configurations of the objects in web page 300. The server may then use the data from the instantiation and the input data to generate web page 400. The server may generate selection control objects 405 based on reconstructing selection control object 305 from selection control viewstate data 343. For example, the server may generate selection control object 405 to include a default selection of "Word Processor", which is included in the input data. In this manner, the server efficiently incorporates selection control object 405 in web page 400 that is consistent with selection control object 305 in web page 300.

In a similar manner, the server may generate control objects 406-408 based on instantiating control objects 305-307 using object-related data 305 and input data. For example, the server may simply use the configurations of control object 305-307 to generate control objects 406-408. The server may then generate object-related data 450 that includes viewstate data 461-464. Object-related data 450 may include a MAC 480, which may or may not be identical to MAC 380 in web page 300.

Figure 5:
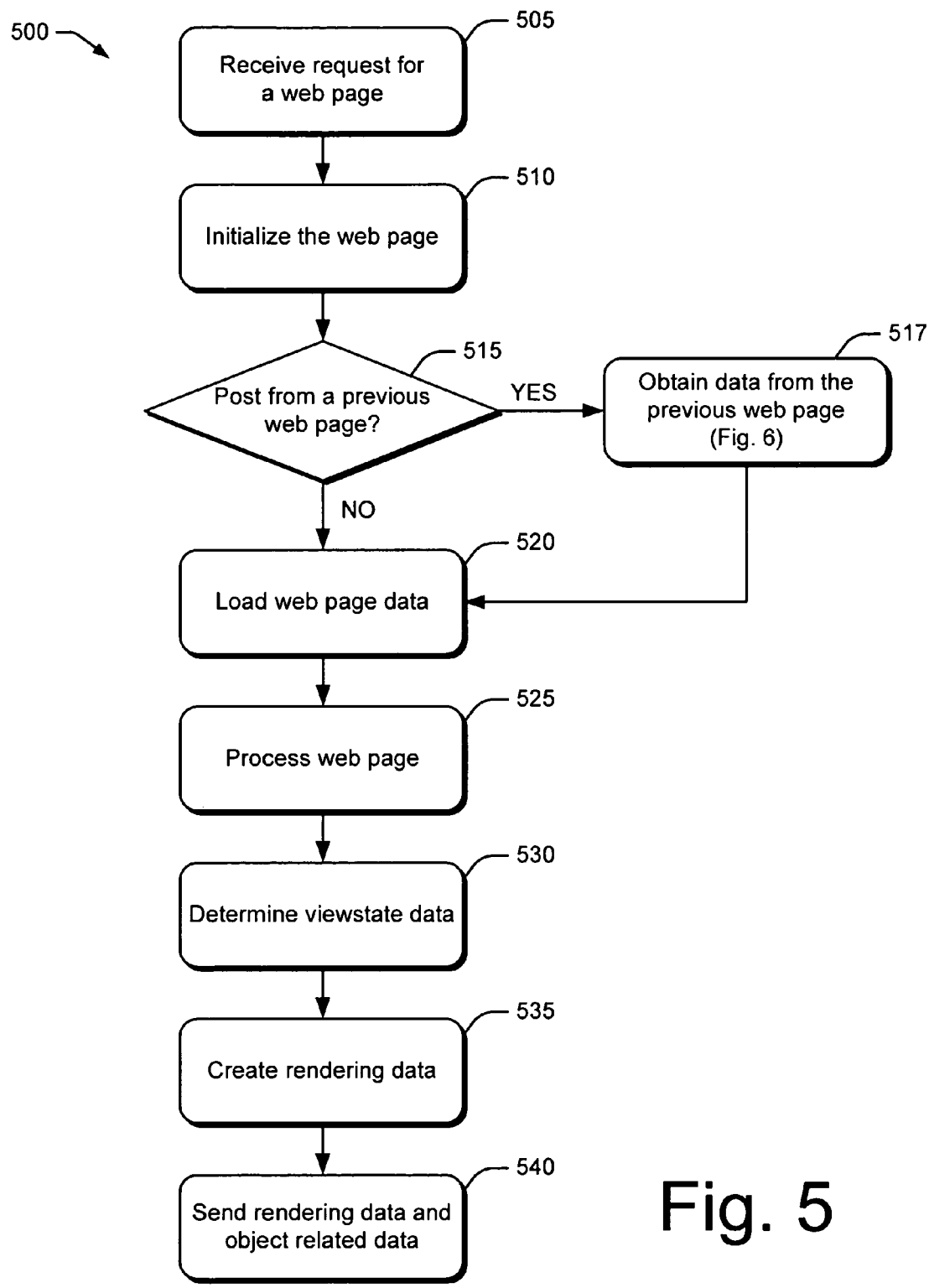
FIG. 5 is a flow diagram of an example process for a server to process a web page request from a client.

FIG. 5 is a flow diagram of an example process 500 for a server to process a web page request from a client. At block 505, a request for a web page is received. The request typically includes an address for the web page. If the request is a post from a previous web page, the request may also include input data and viewstate data associated with control objects in the previous page. At block 510, the requested web page is initialized. At decision block 515, a determination is made whether the request is a post from a previous web page. If so, process 500 moves to block 517 where data about the objects in the previous page is obtained, which will be discussed in more detail in conjunction with FIG. 6. Process 500 then continues at block 520.

Returning to block 515, if the request is not a post from another web page, process 500 moves to block 520 where data associated with the requested web page is loaded. For example, instances of objects that are used to create the requested web page are generated. At block 525, the web page is processed, which may involve performing any updates to the objects in the web page through a set of page lifecycle events before the output of the web page is rendered.

At block 530, the configurations of the control objects in the web page are saved as viewstate data associated with the web page. At block 535, rendering data for the web page is generated. At block 540, the rendering data and the viewstate data are sent to the client.

Figure 6:
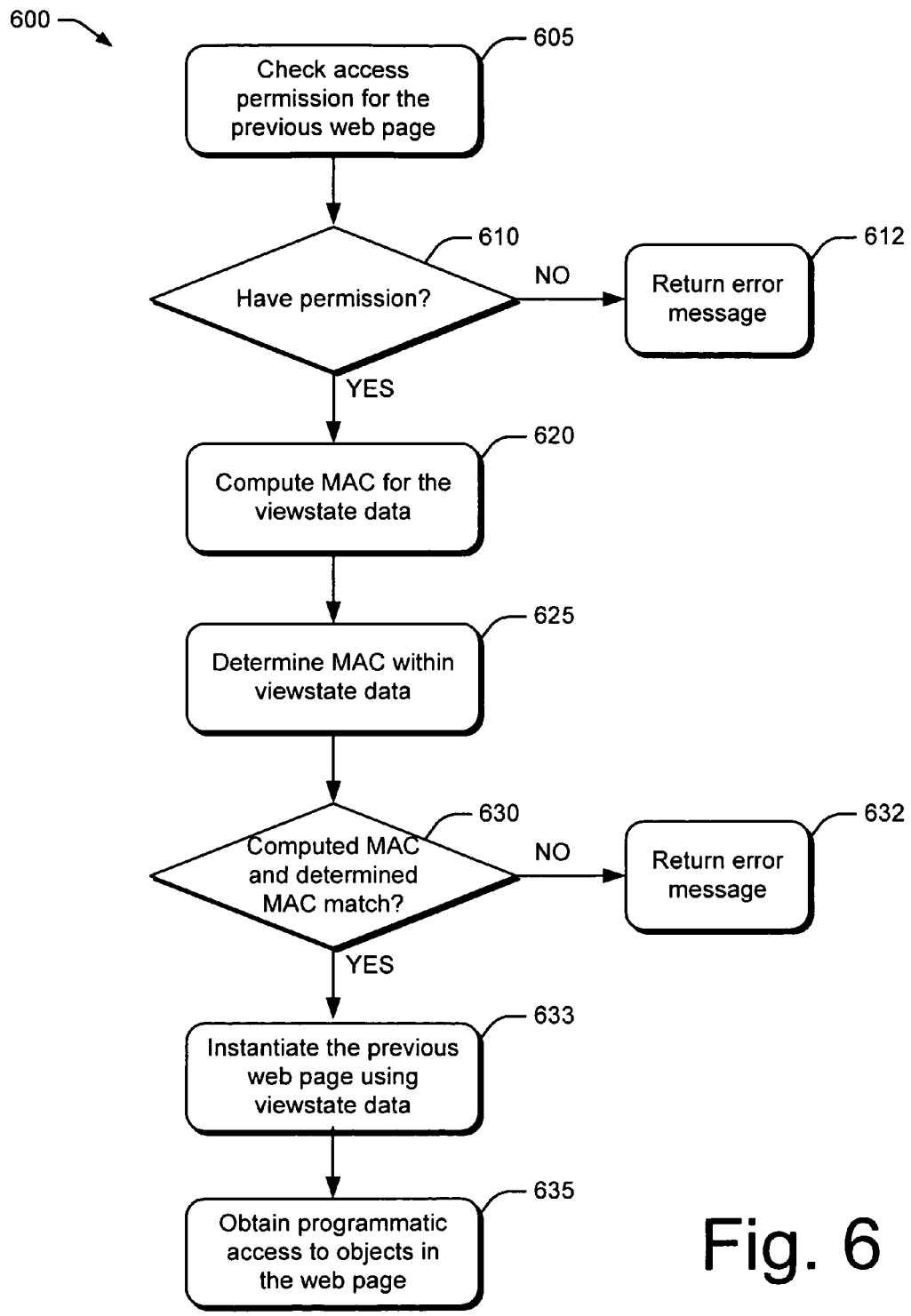
FIG. 6 is a flow diagram of an example process for a server to obtain information about a previous web page for processing a post to a requested web page.

FIG. 6 is a flow diagram of an example process 600 for a server to obtain information about a previous web page for processing a post to a requested web page. At block 605, the access permission for the previous web page from which the post was originated is checked. The access permission may be associated with a posting client or a particular user associated with the client.

At decision block 610, a determination is made whether permission has been granted to access the previous web page. If no permission exists or if the previous page does not exist, process 600 goes to block 612 where an error message is returned.

Returning to decision block 610, if permission exists, the process moves to block 620 where a first message authentication code (MAC) is computed from the viewstate data. At block 625, a second MAC within the viewstate data is determined. At decision block 630, a determination is made whether the computed MAC and the determined MAC match. If the MAC's do not match, process 600 goes to block 612 where an error message is returned.

Returning to decision block 630, if the MAC's match, process 600 moves to block 633 where the previous web page is instantiated using the viewstate and user input data associated with the post. For example, the instances of the control objects in the previous page are reconstructed and configured using the user input and viewstate data. At block 635 where programmatic access to the control objects associated with the previous web page is obtained.

Example codes are discussed below to further illustrate how the described systems and methods can be implemented.

TABLE 1

Example code for posting a page.

```
<form runat="server">
    <asp:TextBox id="TextBox1" runat="server" />
    <br>
    <asp:Button runat="server" Text="Causes PostBack" />
    <br>
    <asp:Button runat="server" Text="Cross Page Post" PostBackUrl="Page2.aspx" />
</form>
```

Table 1 shows an example code section for posting from an original web page to another web page (i.e. page2.aspx). For controls that are configured to post to the other web page, the PostBackUrl property on the button in Table 1 causes the form's action attribute to be set via JavaScript to the appropriate URL for HTML devices that support JavaScript. In the example code in Table 1, button controls are used. One of controls sets the new PostBackUrl property, which causes the original web page to perform an HTTP POST to Page2.aspx when the button is clicked.

TABLE 2

An example page configured for cross-page post.

```
<script runat="server">
  public DropDownList SelectedCountry {
    get {
      return Country;
    }
  }
</script>
<form runat="server">
  <asp:DropDownList id="Country" runat="server">
    <asp:ListItem name="USA" value="0" />
    <asp:ListItem name="Canada" value="1" />
    <asp:ListItem name="Mexico" value="2" />
  </asp:DropDownList>
  <asp:Button runat="server"
PostBackUrl="Page2.aspx" />
</form>
```

TABLE 3

An example page configured to be the target page of a cross-page post.

```
public void Page_Load(Object sender, EventArgs e) {
    int selectedCountryCode = -1;
    // Access a DropDownList control on the page we were posted from
    //
    DropDownList country = (DropDownList) PreviousPage.FindControl("Country ");
    selectedCountryCode = country.SelectedItem.Value;
}
```

TABLE 4

Another example page configured to be the target page of a cross-page post.

```
<%@ PreviousPageVirtualPath="/default.aspx" %>
public void Page_Load(Object sender, EventArgs e) {
    int selectedCountryCode = -1;
    // Access a public property on the page posted from
    //
    selectedCountryCode =
PreviousPage.SelectedCountry.SelectedItem.Value;
}
```

Table 2 shows an example code for an original web page that includes a drop down list control configured for a cross-page post to another web page. Table 3 shows an example code for accessing an original web page where a post has been initiated. Accessing the "posted from" page may be accomplished using the PreviousPage property, which may return type System.Web.UI.Page. Table 4 shows a special "page" directive to control the type returned by the PreviousPage property.

Figure 7:
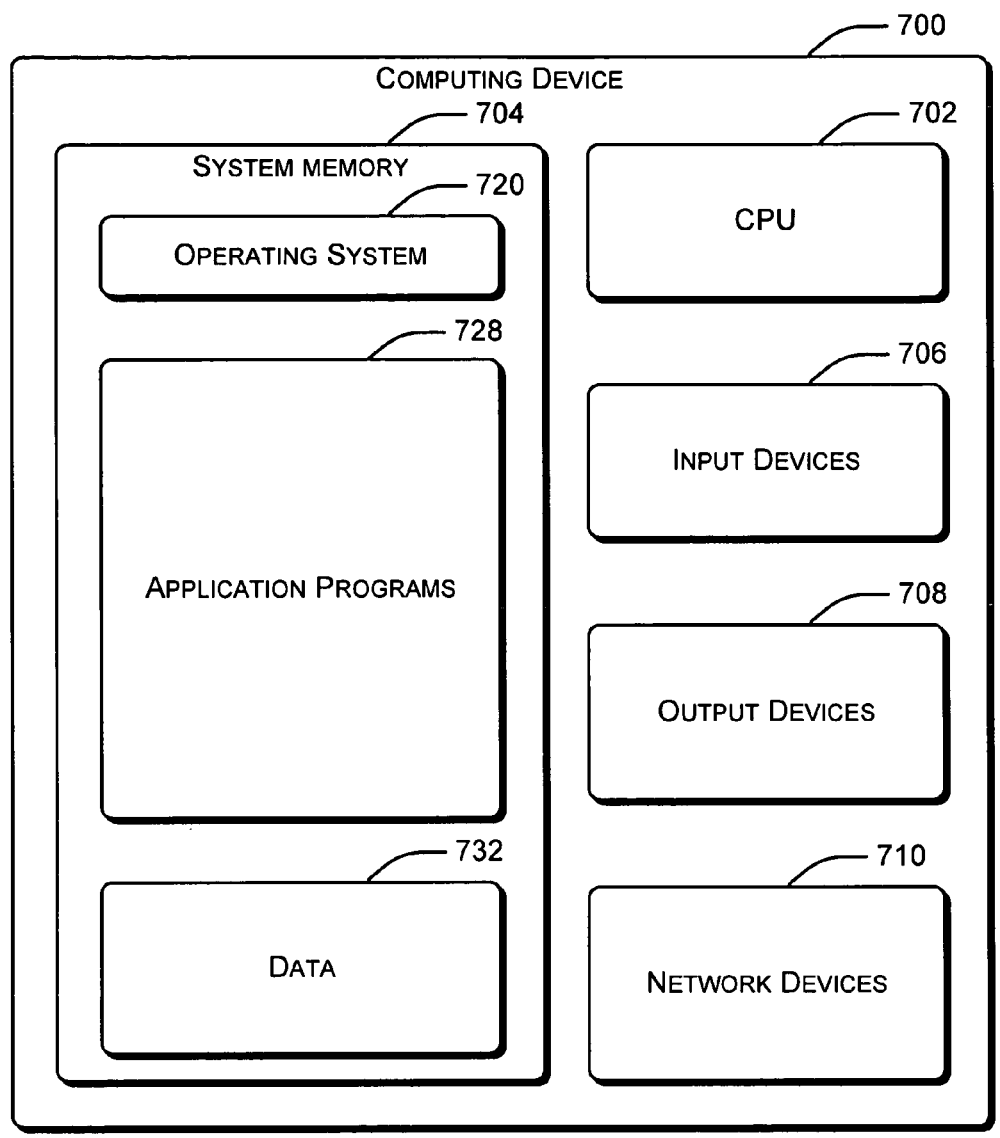
FIG. 7 illustrates an example computing device within which the described systems and methods can be either fully or partially implemented.

FIG. 7 illustrates an example computing device 700 within which the described systems and methods can be either fully or partially implemented. Computing device 700 is only one example of a computing system and is not intended to suggest any limitation as to the scope of the use or functionality of the invention.

Computing device 700 can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The components of computing device 700 can include, but are not limited to, processor 702 (e.g., any of microprocessors, controllers, and the like), system memory 704, input devices 706, output devices 708, and network devices 710.

Computing device 700 typically includes a variety of computer-readable media. Such media can be any available media that is accessible by computing device 700 and includes both volatile and non-volatile media, removable and non-removable media. System memory 704 includes computer-readable media in the form of volatile memory, such as random access memory (RAM), and/or non-volatile memory, such as read only memory (ROM). A basic input/output system (BIOS), containing the basic routines that help to transfer information between elements within computing device 700, such as during start-up, is stored in system memory 704. System memory 704 typically contains data and/or program modules that are immediately accessible to and/or presently operated on by processor 702.

System memory 704 can also include other removable/non-removable, volatile/non-volatile computer storage media. By way of example, a hard disk drive may be included for reading from and writing to a non-removable, non-volatile magnetic media; a magnetic disk drive may be included for reading from and writing to a removable, non-volatile magnetic disk (e.g., a "floppy disk"); and an optical disk drive may be included for reading from and/or writing to a removable, non-volatile optical disk such as a CD-ROM, DVD, or any other type of optical media.

The disk drives and their associated computer-readable media provide non-volatile storage of computer-readable instructions, data structures, program modules, and other data for computing device 700. It is to be appreciated that other types of computer-readable media which can store data that is accessible by computing device 700, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement exemplary computing device 700. Any number of program modules can be stored in system memory 704, including by way of example, an operating system 720, application programs 728, and data 732.

Computing device 700 can include a variety of computer-readable media identified as communication media. Communication media typically embodies computer-readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer-readable media.

A user can enter commands and information into computing device 700 via input devices 706 such as a keyboard and a pointing device (e.g., a "mouse"). Other input devices 706 may include a microphone, joystick, game pad, controller, satellite dish, serial port, scanner, touch screen, touch pads, key pads, and/or the like. Output devices 708 may include a CRT monitor, LCD screen, speakers, printers, and the like.

Computing device 700 may include network devices 710 for connecting to computer networks, such as local area network (LAN), wide area network (WAN), and the like.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method of communication between a client and a server comprising:
   receiving, by the server from the client, a request for a first web page;
   determining, by the server, control objects associated with the first web page;
   determining, by the server, initial viewstate data associated with the control objects, the initial viewstate data representing initial configurations of the control objects associated with the first web page;
   computing, by the server, a first value based, in part, on the initial viewstate data, the first value uniquely identifying the initial viewstate data;
   sending, by the server to the client, the first web page, the initial viewstate data, and the first value, the initial viewstate data stored at the client;
   receiving, by the server from the client a post request for a second web page and revised viewstate data and user inputs, wherein the second web page is posted from the first web page, and wherein the revised viewstate data represents changed configurations of control objects, when the changed configurations of the control objects result from a user input associated with the first web page;
   computing the first value from the revised viewstate data;
   determining a second value within the revised viewstate data object;
   upon determining that the first value and the second value match, creating, by the server, copies of the control objects associated with the first web page in accordance with the revised viewstate data received from the client;
   generating, by the server, the second web page based, at least in part, on the copies of the control objects associated with the first web page created by the server, such that the object related data of the first web page does not need to be regenerated to generate the second web page;
   sending, by the server to the client, the second web page and initial viewstate data associated with the second web page; and
   deleting, prior to receiving any further revised viewstate data from the client, the copies of the control objects associated with the first web page in accordance with the revised viewstate data received from the client.

2. The method as recited in claim 1, further comprising:
   serializing, by the server, the viewstate data; and sending, by the server to the client, the serialized data in accordance with hyper text transfer protocol (HTTP).

3. The method as recited in claim 1, further comprising encrypting, by the server, the viewstate data using a hashing function with the MAC as a key.

4. One or more computer-readable memories containing instructions that are executable by a processor to perform the method recited in claim 1.

5. A method comprising:
   receiving, from a client, a request for posting to a second web page to the client, the request including a user input and a first set of object-related data stored at the client and associated with objects in a first web page displayed by the client, the first set of object-related data including information describing the current state of the objects in the first web page, thereby providing sufficient state information to allow a duplicate of the objects in the first web page to be instantiated by a computer remote from the client;
   computing a first value from the first set of object-related data, the first value uniquely identifying the first set of object-related data;
   determining a second value within the first set of object-related data;
   upon determining that the first value and the second value match, generating at least one object in the second web page based on the instances of the objects in the first web page;
   generating rendering data for the second web page based on the user input and the recreated instances of the objects on the computer remote from the client such that the object related data of the first web page does not need to be regenerated to generate the second web page.

6. The method as recited in claim 5, wherein the first web page includes at least one object representing a control and the first set of object-related data includes viewstate data representing a configuration of the control.

7. The method as recited in claim 6, wherein the configuration of the control includes at least one of a property, a state, or a behavior.

8. The method as recited in claim 6, wherein the control includes at least one of a checkbox, a textbox, a menu selector, a button, or a selectable area.

9. The method as recited in claim 5, wherein the first set of object-related data is deleted from the computer remote from the client when the at least one copy of the object is deleted.

10. The method as recited in claim 5, further comprising:
    if the first value and the second value do not match, determining that there is an error in the first set of object-related data.

11. The method as recited in claim 10, wherein the first value is a message authentication code (MAC) associated with the first set of object-related data.

12. The method as recited in claim 11, wherein the first set of object-related data is encrypted with a hash function that includes the MAC as a key.

13. The method as recited in claim 5, further comprising:
    determining a second set of object-related data representing configurations of objects in the second web page; and
    sending the rendering data of the second web page and the second set of object-related data to the client.

14. The method as recited in claim 5, wherein generating the rendering data includes obtaining programmatic access to at least one copy of an object in the first web page.

15. The method as recited in claim 5, further comprising incorporating at least one copy of an object in the second web page.

16. The method as recited in claim 5, further comprising serializing the second set of object-related data.

17. The method as recited in claim 16, further comprising sending the serialized data to the client in accordance with hyper text transfer protocol (HTTP).

18. The method as recited in claim 17, wherein the serialized data is sent in an HTTP hidden field.

19. The method as recited in claim 1, further comprising:
determining whether a user associated with the client possesses permission to access the first web page; and if the user does not have the permission, returning an error message to the client.

20. An apparatus comprising:
a processor;
means for receiving and storing object-related data associated with a previous web page and a post to a requested web page from a client, the post including a user input and the object-related data, the object-related data including information about a state of the objects in the previous web page sufficient to allow copies of the objects in the previous web page to be instantiated;
means for computing a first value from the object-related data, the first value uniquely identifying the first set of object-related data;
means for determining a second value within the object-related data;
means for determining that the first value and the second value match;
means for creating copies of the objects associated with the previous web page based, at least in part, on the object-related data; and
means for generating rendering data of the requested web page based on the user input and, at least in part, on the reconstructed object instances, such that the object related data of the previous web page does not need to be regenerated to generate the requested web page.

21. The apparatus as recited in claim 20, further comprising:
means for determining that there is an error in the first set of object-related data if the first MAC and the second MAC do not match.

22. The apparatus as recited in claim 20, further comprising:
means for determining object-related data representing configurations of objects in the requested web page; and
means for sending the rendering data of the requested web page and the determined object-related data to the client.

23. The apparatus as recited in claim 20, further comprising:
means for determining whether a user associated with the client possesses permission to access the previous web page; and
means for returning an error message to the client if the user does not have the permission.

24. A system comprising:
a server configured to receive from a client a post request for a second web page including a user input and object-related data, stored at the client, that is associated with a first web page displayed on the client, the server further configured to compute a first value from a first set of object-related data, the first value uniquely identifying the first set of object-related data; the server further configured to determine a second value within the first set of object-related data and upon determining that the first value and the second value match, the server being further configured to instantiate copies of at least some of the objects associated with the first web page with configurations identified by the object-related data and to generate the second web page based on the user input and, at least in part, on the copies and further configured to send the second web page to the client in response to the post request, such that the object related data of the first web page does not need to be regenerated to generate the second web page and, after generating the second web page, deleting the copies of the objects associated with the first web page prior to receiving a response from the client.

25. A system comprising:
a client configured to receive and store initial object-related data associated with a first web page, the object-related data representing initial configurations of objects in the first web page, the object-related data further associated with a first value based, in part, on the object related data, the first value uniquely identifying the first set of object-related data, the client being further configured to post from the first web page to a second web page and to include a user input and a revised object-related data along with a post request for the second web page wherein the revised set of object-related data represents a current state of the objects in the first web page; and
a server configured to receive from the client the post request for the second web page and the revised object-related data, the server further configured to compute a first value from a first set of object-related data, the value uniquely identifying the first set of object-related data; the server further configured to determine a second value within the first set of object-related data and upon determining that the first value and the second value match, the server being further configured to instantiate copies of one or more of the objects associated with the first web page with the current state represented by the revised object-related data and to generate the second web page based on the user input and, at least in part, on the copies, such that the initial object related data of the first web page does not need to be regenerated to generate the second web page.

26. The system as recited in claim 25, wherein the object-related data are data representing configurations of at least one control object in the first web page.

27. The system as recited in claim 24, further comprising a data store having objects used by the server to generate web pages.

28. The system as recited in claim 27, wherein the objects in the data store are associated with dynamic content.

29. The system as recited in claim 28, wherein the dynamic content is stored in another server.

\* \* \* \* \*